(12) United States Patent
Torene et al.

(10) Patent No.: US 12,367,347 B2
(45) Date of Patent: Jul. 22, 2025

(54) SYSTEM AND METHOD FOR AUTOMATED HASHTAG HIERARCHICAL ONTOLOGY GENERATION FROM SOCIAL MEDIA DATA

(71) Applicant: Thomson Reuters Enterprise Centre GmbH, Zug (CH)

(72) Inventors: Spencer Bradley Torene, Potomac, MD (US); Blake Stephen Howald, Northfield, MN (US)

(73) Assignee: Thomson Reuters Enterprise Centre GmbH, Zug (CH)

( * ) Notice: Subject to any disclaimer, the term of this patent is extended or adjusted under 35 U.S.C. 154(b) by 476 days.

(21) Appl. No.: 17/581,666

(22) Filed: Jan. 21, 2022

(65) Prior Publication Data
US 2022/0237384 A1    Jul. 28, 2022

Related U.S. Application Data

(60) Provisional application No. 63/140,461, filed on Jan. 22, 2021.

(51) Int. Cl.
*G06F 40/30* (2020.01)
*G06F 16/36* (2019.01)

(52) U.S. Cl.
CPC ............ *G06F 40/30* (2020.01); *G06F 16/367* (2019.01)

(58) Field of Classification Search
CPC ...... G06F 40/30; G06F 40/211; G06F 40/216; G06F 40/279
See application file for complete search history.

(56) References Cited

U.S. PATENT DOCUMENTS

| | | |
|---|---|---|
| 2005/0278325 A1 | 12/2005 | Mihalcea et al. |
| 2010/0281025 A1 | 11/2010 | Tsatsou et al. |
| 2012/0066212 A1 | 3/2012 | Jennings |

(Continued)

OTHER PUBLICATIONS

Patent Cooperation Treaty, International Search Report and Written Opinion issued for PCT Application No. PCT/US2022/013362, dated Apr. 15, 2022, 8 pages.

(Continued)

*Primary Examiner* — Daniel C Washburn
*Assistant Examiner* — Paul J. Mueller
(74) *Attorney, Agent, or Firm* — Norton Rose Fulbright US LLP

(57) ABSTRACT

Aspects of the present disclosure provide systems, methods, apparatus, and computer-readable storage media for determining semantic relationships between hashtags in social media messages, particularly for use in generating a hierarchical ontology of hashtags based on co-occurrence frequency and diversity metrics. For example, natural language processing may be performed on a plurality of social media messages to extract hashtags from the social media messages. Co-occurrence frequency counts for at least two hashtags and other hashtags, in addition to an ensemble score based on a combination of one or more diversity metrics, may be determined. A hierarchical ontology may be generated based on the co-occurrence frequency counts and the ensemble scores for the at least two hashtags. Such a hierarchical ontology may group hashtags into communities of common topics that are ordered based on ensemble scores.

24 Claims, 6 Drawing Sheets

(56) References Cited

U.S. PATENT DOCUMENTS

| | | | |
|---|---|---|---|
| 2013/0332162 A1* | 12/2013 | Keen | G06F 16/00 |
| | | | 704/235 |
| 2015/0120788 A1 | 4/2015 | Brun et al. | |
| 2015/0169627 A1 | 6/2015 | Gildfind et al. | |
| 2016/0004687 A1* | 1/2016 | Kurian | G06F 40/242 |
| | | | 704/10 |
| 2016/0132904 A1* | 5/2016 | Mondal | G06Q 30/0201 |
| | | | 705/7.29 |
| 2016/0188567 A1* | 6/2016 | Pasternack | G06F 40/284 |
| | | | 704/9 |
| 2016/0269344 A1* | 9/2016 | Anders | H04L 51/52 |
| 2016/0307278 A1* | 10/2016 | Lipka | G06Q 30/0201 |
| 2016/0328401 A1* | 11/2016 | Dhawan | G06F 16/9535 |
| 2016/0357870 A1* | 12/2016 | Hentschel | G06F 16/285 |
| 2017/0230387 A1* | 8/2017 | Srinivasan | G06F 16/3334 |
| 2019/0164234 A1* | 5/2019 | Barash | G06F 16/285 |
| 2020/0242669 A1* | 7/2020 | Carroll | G06N 20/00 |
| 2021/0406324 A1* | 12/2021 | Cuan | G06F 16/954 |

OTHER PUBLICATIONS

European Patent Office, Communication, Extended European Search Report issued for European Patent Application No. 22743268.9, dated Nov. 4, 2024, 8 pages.

Weng, Lilian et al. "Topicality and Social Impact: Diverse Messages but Focused Messengers," Cornell University Online Library; Public Library of Science, https://arxiv.org/abs/1402.5443; Feb. 2014, 9 pages.

* cited by examiner

SYSTEM AND METHOD FOR AUTOMATED HASHTAG HIERARCHICAL ONTOLOGY GENERATION FROM SOCIAL MEDIA DATA

CROSS-REFERENCE TO RELATED APPLICATIONS

The present application claims the benefit of priority from U.S. Provisional Application No. 63/140,461 filed Jan. 22, 2021 and entitled "AUTOMATED TWITTER HASHTAG HIERARCHY GENERATION USING COMMUNITY DETECTION AND THE SHANNON DIVERSITY INDEX," the disclosure of which is incorporated by reference herein in its entirety.

TECHNICAL FIELD

Aspects of the present disclosure relate generally to generating hierarchical ontologies of hashtags in social media data. In particular, hierarchical ontologies may generated using community detection based on hashtag co-occurrence and hierarchical ordering based on diversity metrics.

BACKGROUND

Social media continues to increase in popularity and use around the world. Although social media messages share some similarities with news articles and other conventional documents, social media users also develop their own lexicon that does not always reflect structural or grammatical rules of their native languages. One particular example is the use of "hashtags" in social media messages to convey meaning in a condensed form. A hashtag may refer to the symbol "#" preceding one or more words, or one or more word-like structures, such as names, abbreviations, intentionally misspelled words, letter and number combinations resembling words, or the like. These hashtags are used to reference other social media messages with the same hashtags, to reference concepts that would take larger amounts of characters to convey, to provide readers with additional context for a social media message, or the like. Some examples of popular hashtags include "#love," "#instagood," "#tbt," "#follow4follow," "#swag," "#bhfyp," and "#goals." As can be seen from these examples, hashtags do not necessarily follow rules of any language, and therefore analysis of social media messages is challenging.

Given the volume of users and content on social media sites and applications, and the above-described difficulties regarding social media lexicons, it is difficult to parse and analyze social media data. To address some of these challenges, it may be useful to use strategies to organize social media data relative to different analytical use cases, such as trending topics or community detection. Organization around hashtags is one such strategy. For example, "#AI" in the following social media message provides a high level topic: "US govt. has announced today the initiation of The National Artificial Intelligence Initiative Office to regulate #AI research and policy." Hashtag frequency is a common measurement used to determine trending information or ideas, and hashtag co-occurrence (e.g., the inclusion of two hashtags in a single social media message) can show relationships between hashtags. There are multiple difficulties with analyzing hashtags and attempting to build hashtag-based semantic structures or performing classification of hashtags, such as normalization, segmentation, and the like. However, the greatest difficulty may be the inherent variation in hashtag semantics. To illustrate, hashtags are part of a folksonomy/user-created lexicon without an associated ontology or reference, and as such, hashtags may be used at different times, places, or contexts, hashtags may not be equivalent to words, and the motivation for using hashtags may vary by user (e.g., motivations may include conveying emotion, sentiment, topics, named entities, etc.).

While a folksonomy, such as one for hashtags, bears some resemblance to a logical, semantically consistent taxonomy, a folksonomy is not entirely the same as a semantically consistent taxonomy. For example, a folksonomy is an ephemeral reflection of how people are actually producing language and interacting in the genre of social media. These reflections are too dynamic to establish a static, semantically coherent hierarchy. Without such a hierarchy, there is no semantic structure to rely on consistently for different analytical purposes. As such, analyzing and semantically understanding social media, particular the use of hashtags, remains challenging, thereby preventing hashtags in social media data from being used as the basis for analytical purposes such as predictions, recommendations, and the like.

SUMMARY

Aspects of the present disclosure provide systems, methods, apparatus, and computer readable media for determining semantic relationships between hashtags in social media messages. In particular, these semantic relationships may be used to generate a hierarchical ontology of hashtags that provides a static, semantically coherent hierarchical structure for analyzing and understanding hashtags and social media data. The hierarchical ontology may be based on co-occurrence frequency of hashtags with other hashtags and the ensemble diversity of hashtags based on one or more diversity metrics. In some implementations, the hierarchical ontology may include or correspond to a graph of nodes that represent hashtags, with edges between nodes representing co-occurrence frequency between two hashtags (e.g., a number of social media messages that include both of the two hashtags). The nodes may be assigned (e.g., clustered) into communities using community detection such that communities of highly co-occurring hashtags are formed, and each community may be ordered based on ensemble scores, which represent a combination of various diversity metrics for the corresponding hashtag. As such, a hashtag having the highest diversity score within a community in the hierarchical ontology may represent the most general hashtag within the community, and hashtags having lower diversity scores may represent increasingly specific hashtags. As an example, #AI may have the highest ensemble diversity score (i.e., be most general) in a particular community, and increasingly specific hashtags in the community may include #machinelearning, #robot, and #datascience.

To illustrate determination of semantic relationships between hashtags, a server (or other computing device) may perform one or more natural language processing operations on social media messages to extract multiple hashtags. The server may determine co-occurrence frequency counts for some or all of the extracted hashtags. For example, a co-occurrence frequency count for a first hashtag and a second hashtag may be determined as the number of social media messages that include both the first hashtag and the second hashtag. Additionally, the server may determine one or more diversity metrics for some or all of the extracted hashtags. The diversity metrics may represent a distribution of the hashtags across different communities, different dates or time, different users, or the like, and in some implementations may be based on the Shannon entropy. After determining the diversity metrics, the server may calculate an ensemble score for some or all of the extracted hashtags based on the corresponding diversity metrics. For example, the ensemble score for a representative hashtag may be a sum or a weighted sum of the one or more diversity metrics for the hashtag. The server may generate a hierarchical ontology of some or all of the hashtags based on the co-occurrence frequency counts and the ensemble scores for the hashtags. In some implementations, generating the hierarchical ontology includes generating a graph of nodes connected by edges, with the nodes representing hashtags and weights of the edges representing co-occurrence frequency between connected hashtags. After generating the graph, the server may perform community detection based on the co-occurrence frequency counts to assign (e.g., cluster) the nodes into multiple communities, and nodes within each community may be ordered based on ensemble scores of the corresponding hashtags. The generated hierarchical ontology may be stored as semantic data, such as at a memory accessible to the server or at a device communicatively coupled to the server, for use in performing one or more social media analysis tasks or semantic processing tasks. For example, the hierarchical ontology may be leveraged to predict additional trending hashtags based on input hashtags, to suggest additional hashtags for inclusion in a social media message based on a hashtag included in the social media message, or for expanding training data that includes multiple hashtags, as non-limiting examples.

In one particular aspect, a method for determining semantic relationships between hashtags in social media messages includes receiving, by one or more processors, social media data including a plurality of social media messages. The method also includes performing, by the one or more processors, natural language processing (NLP) on the social media data to extract a plurality of hashtags included in the plurality of social media messages. The method includes determining, by the one or more processors and for each of at least two hashtags of the plurality of hashtags, one or more co-occurrence frequency counts for the hashtag and other hashtags of the plurality of hashtags. A co-occurrence frequency count for any two hashtags represents a count of social media messages of the plurality of social media messages that include both the two hashtags. The method also includes determining, by the one or more processors and for the at least two hashtags, one or more diversity metrics that indicate a distribution of the at least two hashtags across the plurality of social media messages, with respect to other hashtags of the plurality of hashtags, or both. The method includes determining, by the one or more processors and for each of the at least two hashtags, an ensemble score based on a combination of the one or more diversity metrics that correspond to the hashtag. The method also includes generating, by the one or more processors, a hierarchical ontology of hashtags based on the ensemble scores for the at least two hashtags and the one or more co-occurrence frequency counts for the at least two hashtags. The method further includes storing, by the one or more processors, hashtag semantic data that represents the hierarchical ontology.

In another aspect, a system for determining semantic relationships between hashtags in social media messages includes a memory and one or more processors communicatively coupled to the memory. The one or more processors are configured to receive social media data including a plurality of social media messages. The one or more processors are also configured to perform NLP on the social media data to extract a plurality of hashtags included in the plurality of social media messages. The one or more processors are configured to determine, for each of at least two hashtags of the plurality of hashtags, one or more co-occurrence frequency counts for the hashtag and other hashtags of the plurality of hashtags. A co-occurrence frequency count for any two hashtags represents a count of social media messages of the plurality of social media messages that include both the two hashtags. The one or more processors are also configured to determine, for the at least two hashtags, one or more diversity metrics that indicate a distribution of the at least two hashtags across the plurality of social media messages, with respect to other hashtags of the plurality of hashtags, or both. The one or more processors are configured to determine, for each of the at least two hashtags, an ensemble score based on a combination of the one or more diversity metrics that correspond to the hashtag. The one or more processors are also configured to generate a hierarchical ontology of hashtags based on the ensemble scores for the at least two hashtags and the one or more co-occurrence frequency counts for the at least two hashtags. The one or more processors are further configured to store hashtag semantic data that represents the hierarchical ontology.

In another aspect, a non-transitory computer-readable storage medium stores instructions that, when executed by one or more processors, cause the one or more processors to perform operations for determining semantic relationships between hashtags in social media messages. The operations include receiving social media data including a plurality of social media messages. The operations also include performing NLP on the social media data to extract a plurality of hashtags included in the plurality of social media messages. The operations include determining, for each of at least two hashtags of the plurality of hashtags, one or more co-occurrence frequency counts for the hashtag and other hashtags of the plurality of hashtags. A co-occurrence frequency count for any two hashtags represents a count of social media messages of the plurality of social media messages that include both the two hashtags. The operations also include determining, for the at least two hashtags, one or more diversity metrics that indicate a distribution of the at least two hashtags across the plurality of social media messages, with respect to other hashtags of the plurality of hashtags, or both. The operations include determining, for each of the at least two hashtags, an ensemble score based on a combination of the one or more diversity metrics that correspond to the hashtag. The operations also include generating a hierarchical ontology of hashtags based on the ensemble scores for the at least two hashtags and the one or more co-occurrence frequency counts for the at least two hashtags. The operations further include storing hashtag semantic data that represents the hierarchical ontology.

Aspects of the present disclosure may provide benefits compared to other techniques for analyzing semantic relationships of hashtags or attempting to generate semantic structures of hashtags. For example, the techniques described herein enable generation of a semantically consistent hierarchy of hashtags that takes into account the generality or specificity of hashtag use in social media messages. As such, the hierarchical ontology supports analysis and semantic processing operations that are generality-aware, unlike other ephemeral folksonomies that provide little to no semantic analysis value. Additionally, because the hierarchical ontology is based at least in part on co-occurrence frequency, instead of merely co-occurrence, the hierarchical ontology described herein takes into account both generality and popularity of hashtags (e.g., across different communities/uses, different dates or times, different users, etc.), as well as the distribution of co-occurrences. By taking into account these additional concepts, the hierarchical ontology described herein provides predictive value for other co-occurring features, such as topics, users, posting times, and the like. Thus, aspects of the present disclosure may be leveraged to provide improved semantic analysis of hashtags in social media messages, resulting to more robust operations such as predictions or input expansion, that is not possible using other hashtag analysis techniques, and such benefits may be provided faster and using less processing resources than manually defining a gold standard taxonomy.

The foregoing has outlined rather broadly the features and technical advantages of the present disclosure in order that the detailed description that follows may be better understood. Additional features and advantages will be described hereinafter which form the subject of the claims of the disclosure. It should be appreciated by those skilled in the art that the conception and specific aspects disclosed may be readily utilized as a basis for modifying or designing other structures for carrying out the same purposes of the present disclosure. It should also be realized by those skilled in the art that such equivalent constructions do not depart from the scope of the disclosure as set forth in the appended claims. The novel features which are disclosed herein, both as to organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawings, in which.

Figure 1:
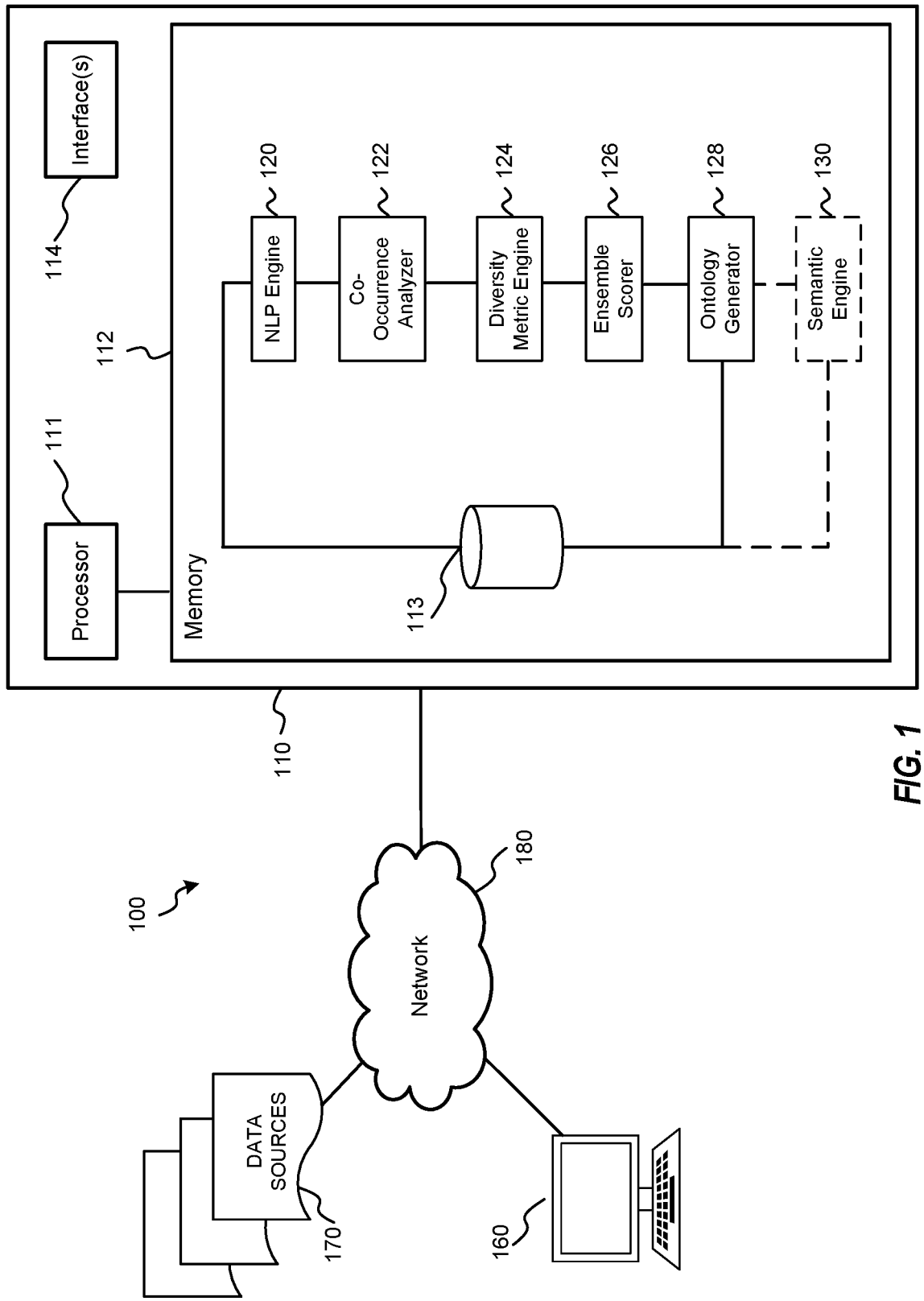
FIG. 1 is a block diagram of an example of a system for determining semantic relationships, indicated by hierarchical ontologies, of hashtags in social media data according to one or more aspects.

It should be understood that the drawings are not necessarily to scale and that the disclosed aspects are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular aspects illustrated herein.

DETAILED DESCRIPTION

Various features and advantageous details are explained more fully with reference to the non-limiting aspects that are illustrated in the accompanying drawings and detailed in the following description. Descriptions of well-known starting materials, processing techniques, components, and equipment are omitted so as not to unnecessarily obscure the aspects of the disclosure in detail. It should be understood, however, that the detailed description and the specific examples, while indicating various implementations, are given by way of illustration only, and not by way of limitation. Various substitutions, modifications, additions, and/or rearrangements within the scope of the disclosure will become apparent to those skilled in the art from this disclosure.

Aspects of the present disclosure provide systems, methods, apparatus, and computer readable media for determining semantic relationships between hashtags in social media messages, particularly for generating hierarchical ontologies of hashtags. A hierarchical ontology of hashtags may be based on co-occurrence frequency of hashtags with other hashtags and ensemble scores that are based on one or more diversity metrics. The hierarchical ontology may be used to analyze social media data or for semantic processing, in order to identify other co-occurring features. As non-limiting examples, the hierarchical ontology may be used to predict related hashtags or to expand input sets of hashtags, for use in forecasting trending hashtags, providing automatic hashtag recommendations to users, expanding training data for machine learning models, or the like. Although described herein in the context of hashtags included in social media messages, the systems and methods described herein may be applicable in other contexts, such as for determining semantic relationships of other word-like elements that convey meaning, such as titles, logos, slang, jargon, and/or other combinations of alphanumeric characters, punctuation, and the like, that are included in documents, emails, social media messages, text messages, multimedia content, or the like. As non-limiting examples, aspects described herein may be used to generate hierarchical ontologies for unicode characters, emoticons, emojis, numeronyms, hybrid-numeronyms, or the like, in news feeds, social media data, or the like.

In some implementations, aspects of the present disclosure focus on one facet of generating a hierarchical ontology of hashtags—determining the relative "generality" of each hashtag—which may ameliorate some of the challenges described with respect to generating static, semantically-consistent hashtag ontologies. What "generality" means for hashtags may vary, as there is no one definition of "general" that firmly establishes an automatic hierarchy creation process. One current generality score used for hashtags is degree of co-occurrence with other hashtags, which is defined as the number of distinct other hashtags that are included in the same social media message as a particular hashtag. Studies have shown that simple measures of degree of co-occurrence, such as degree centrality, are more effective for determining abstractness than gold standard hierarchies such as WordNet, in addition to performing better than probabilistic models. However, degree centrality does not solve the problem of hashtag generality versus popularity. For example, in a representative sampling of social media posts from 2016-2019, #coronavirus is used at a rate 52 times higher than #virus and has 32 times higher degree of centrality, even though coronavirus is a hyponym of virus (e.g., coronavirus is more specific/less general than virus).

In order to address some of the issues with degree centrality, aspects of the present disclosure broaden the idea behind hashtag co-occurrence to account for the distribution of the co-occurrences and the ability to predict other co-occurring features such as topics, users, posting times/dates, and the like. This frames hashtag generality into a question of context diversity, analogous to ecological biodiversity, for which information entropy is a measure of the number and abundance of species within an ecological community. In some implementations, the Shannon Diversity Index (SDI), which is a measurement of information entropy in the ecological biodiversity context, is used as the basis for determining diversity metrics for hashtags in social media messages. In some such implementations, as described further herein, the Shannon entropy for a hashtag may be measured for six different features involving time, users, hashtags, and hashtag communities to help address how event-driven or community-specific hashtags may be. The resulting hierarchy may be organized by "topics" (e.g., hashtag communities) and ordered by hashtag diversity. Such a hierarchy (e.g., hierarchical ontology) maintains edges in a graph representation of the communities and does not join nodes, unlike other parent-child hierarchies. As described further herein, it may be demonstrated through visualization and quantitative analysis of experimental results (1) that a sensible hierarchy can be automatically generated through community detection and the combination of six measures of entropy (e.g., diversity) involving time, users, hashtags, and hashtag communities as one ensemble diversity index (EDI), and (2) that there are some pleasing emergent properties of the of the hierarchical ontologies generated according to aspects herein as compared to degree co-occurrence.

Referring to FIG. 1, an example of a system for determining semantic relationships of hashtags in social media data according to one or more aspects is shown as system 100. The semantic relationships may be indicated by, or used to determine, a hierarchical ontology of hashtags. As shown in FIG. 1, system 100 includes server 110, at least one user terminal 160, at least one data source 170, and network 180. These components, and their individual components, may cooperatively operate to provide functionality in accordance with the discussion herein. For example, in operation according to one or more implementations, social media data (e.g., text data or the like) may be obtained from data sources 170 and may be provided as input to server 110. The various components of server 110 may cooperatively operate to extract hashtags from social media data and to generate a hierarchical ontology for some, or all, of the extracted hashtags. For example, the various components of server 110 may cooperatively operate to extract multiple hashtags from social media data (e.g., by performing natural language processing (NLP) operations on social media messages) and to determine co-occurrence frequency counts of each (or at least two) hashtag with other extracted hashtags. The various components of server 110 may also determine one or more diversity metrics corresponding to the hashtags. In some implementations, the one or more diversity metrics are based on co-occurrences, communities of hashtags, and social media metadata, such as date and/or time information, user information, and the like. After determining the one or more diversity metrics for the hashtags, the components of server 110 may determine an ensemble score for each (or the at least two) hashtag(s) based on the one or more diversity metrics corresponding to the hashtag. The components of server 110 may generate a hierarchical ontology for the hashtags (or the at least two hashtags) based on the co-occurrence frequency counts and the ensemble scores. In some implementations, the hierarchical ontology may include or correspond to a graph of nodes (representing hashtags) that are connected by edges (with weights of the edges indicating co-occurrence frequency of the connected hashtags), and the nodes may be assigned (e.g., clustered) into communities using community detection, and nodes within each community ordered based on ensemble scores. The components of server 110 may generate and store semantic data that represents the hierarchical ontology and/ or use the semantic data as a basis for performing semantic processing and analysis operations on hashtags. As such, various aspects of the present disclosure allow semantic analysis and hierarchical ontology generation for hashtags in social media for use in identifying related features, such as identifying related hashtags, topics, times or dates, users, etc., to an input hashtag for use in forecasting trends, suggesting outputs, expanding training data sets, or the like, as further described herein. Although described in the context of hashtags in social media data, the configurations and operations described with reference to FIG. 1 may be applied in other contexts to enable generation of hierarchical ontologies of any type of word-like elements that convey meaning and are included in any type of messages or content.

It is noted that the functional blocks, and components thereof, of system 100 of implementations of the present invention may be implemented using processors, electronics devices, hardware devices, electronics components, logical circuits, memories, software codes, firmware codes, etc., or any combination thereof. For example, one or more functional blocks, or some portion thereof, may be implemented as discrete gate or transistor logic, discrete hardware components, or combinations thereof configured to provide logic for performing the functions described herein. Additionally or alternatively, when implemented in software, one or more of the functional blocks, or some portion thereof, may comprise code segments operable upon a processor to provide logic for preforming the functions described herein.

It is also noted that various components of system 100 are illustrated as single and separate components. However, it will be appreciated that each of the various illustrated components may be implemented as a single component (e.g., a single application, server module, etc.), may be functional components of a single component, or the functionality of these various components may be distributed over multiple devices/components. In such aspects, the functionality of each respective component may be aggregated from the functionality of multiple modules residing in a single, or in multiple devices.

In some aspects, server 110, user terminal 160, and data sources 170 may be communicatively coupled via network 180. Network 180 may include a wired network, a wireless communication network, a cellular network, a cable transmission system, a Local Area Network (LAN), a Wireless LAN (WLAN), a Metropolitan Area Network (MAN), a Wide Area Network (WAN), the Internet, the Public Switched Telephone Network (PSTN), etc., that may be configured to facilitate communications between user terminal 160 and server 110.

User terminal 160 may be implemented as a mobile device, a smartphone, a tablet computing device, a personal computing device, a laptop computing device, a desktop computing device, a computer system of a vehicle, a personal digital assistant (PDA), a smart watch, another type of wired and/or wireless computing device, or any part thereof. User terminal 160 may be configured to provide a user interface (UI) via which a user may interact with server 110. For example, user terminal 160 may enable a user to select social media data from which hashtags may be extracted for generating a hierarchical ontology by server 110. The UI may be configured to display the hierarchical ontology (e.g., a graph of nodes and edges representing the hashtags). Additionally or alternatively, the UI may indicate one or more outputs that are generated based on input data and the hierarchic ontology, such as one or more suggested hashtags or one or more predictions of trending hashtags, as non-limiting examples.

Data sources 170 may comprise at least one source of social media data. For example, the data source(s) may include one or more social media web sites, one or more social media applications, one or more databases of social media messages, one or more streaming data services, other data sources, or the like. As non-limiting examples, the social media data may include social media messages from sites or applications such as Facebook®, Twitter®, Instagram®, TikTok®, or the like. The social media data may include text data, image data, audio data, multimedia data, virtual reality data, augmented reality data, any other type of social media data, or any combination thereof. Although described herein as social media data, in some other implementations, data received from data sources 170 may include audio clips, podcasts, audio streams, video clips, video streams, virtual reality data, multimedia content, interactive content, articles or other text data, text messages, messaging application messages, or other types of data or media content.

Server 110 may be configured to receive social media data from data sources 170, to perform NLP operations, to determine diversity metrics and ensemble scores, and/or other processing to generate hierarchical ontologies of hashtags included in social media messages represented by the social media data. This functionality of server 110 may be provided by the cooperative operation of various components of server 110, as will be described in more detail below. Although FIG. 1 shows a single server 110, it will be appreciated that server 110 and its individual functional blocks may be implemented as a single device or may be distributed over multiple devices having their own processing resources, whose aggregate functionality may be configured to perform operations in accordance with the present disclosure. In some implementations, server 110 may be implemented, wholly or in part, on an on-site system, or on a cloud-based system.

As shown in FIG. 1, server 110 includes processor 111, memory 112, database 113, NLP engine 120, co-occurrence analyzer 122, diversity metric engine 124, ensemble scorer 126, ontology generator 128, and semantic engine 130. It is noted that the various components of server 110 are illustrated as single and separate components in FIG. 1. However, it will be appreciated that each of the various components of server 110 may be a single component (e.g., a single application, server module, etc.), may be functional components of a same component, or the functionality may be distributed over multiple devices/components. In such aspects, the functionality of each respective component may be aggregated from the functionality of multiple modules residing in a single, or in multiple devices.

In some aspects, processor 111 may comprise a processor, a microprocessor, a controller, a microcontroller, a plurality of microprocessors, an application-specific integrated circuit (ASIC), an application-specific standard product (ASSP), or any combination thereof, and may be configured to execute instructions to perform operations in accordance with the disclosure herein. In some aspects, implementations of processor 111 may comprise code segments (e.g., software, firmware, and/or hardware logic) executable in hardware, such as a processor, to perform the tasks and functions described herein. In yet other aspects, processor 111 may be implemented as a combination of hardware and software. Processor 111 may be communicatively coupled to memory 112.

Memory 112 may comprise read only memory (ROM) devices, random access memory (RAM) devices, one or more hard disk drives (HDDs), flash memory devices, solid state drives (SSDs), other devices configured to store data in a persistent or non-persistent state, network memory, cloud memory, local memory, or a combination of different memory devices. Memory 112 may store instructions that, when executed by processor 111, cause processor 111 to perform operations in accordance with the present disclosure. In aspects, memory 112 may also be configured to facilitate storage operations. For example, memory 112 may comprise database 113 for storing hashtag semantic data, hierarchical ontologies, hashtags, co-occurrence frequency counts, diversity metrics, ensemble scores, thresholds, received input data, other information, etc., or any combination thereof, which system 100 may use to provide the features discussed herein. Database 113 may be integrated into memory 112, or may be provided as a separate module. In some aspects, database 113 may be a single database, or may be a distributed database implemented over a plurality of database modules. In some embodiments, database 113 may be provided as a module external to server 110. Additionally, or alternatively, server 110 may include interface 114 (e.g., one or more interfaces) configured to enable communication with data source 170, user terminal 160 (e.g., an electronic device), network 180, or a combination thereof. For example, interface 114 may include one or more input/output (I/O) interfaces, one or more network interfaces, one or more display interfaces, other interfaces, or any combination thereof.

NLP engine 120 may be configured to perform one or more NLP operations on social media data to extract multiple hashtags from the social media data. The social media data represents multiple social media messages, and may be retrieved from one or more social media websites or applications (apps). In some implementations, prior to performing the NLP operations, NLP engine 120 may perform one or more operations to identify text data within the social media data, such as one or more object recognition operations, one or more text recognition operations, optical character recognition operations, language translation operations, or the like. Additionally or alternatively, NLP engine 120 may perform one or more pre-processing operations on the social media data prior to performing the NLP operations, such as contraction expansion, case conversion, punctuation removal, removal of words that include unrecognized characters, stopword removal, text rephrasing, stemming and lemmatization, white space removal, or the like, or any combination thereof. Performing NLP on the (optionally pre-processed) social media data may generate processed text data, vectorized representations of text, or the like, from which the hashtags can be extracted. The NLP operations may recognize characters, words, sentences, punctuation marks, or a combination thereof, in the social media data and organize or structure the recognized elements for processing. For example, the NLP performed by NLP engine 120 may include tokenization, lemmatization, stemming, phrasing, sentencization, part-of-speech tagging, dependency parsing, stop-character parsing, and named entity recognition, other processing operations, or a combination thereof. After performing the NLP operations, NLP engine 120 may identify and extract the hashtags from processed social media data. As used herein, a hashtag includes a word-like structure preceded by a hash character "#". Non-limiting examples of hashtags include "#love," "#instagood," "#tbt," "#follow4follow," "#swag," "#bhfyp," and "#goals." Although described herein as using NLP to extract hashtags from social media messages, in other implementations, extraction of hashtags may be performed by identifying the hashtags using structure data, such as JavaScript Object Notation (JSON) data, as a non-limiting example.

Co-occurrence analyzer 122 may be configured to determine co-occurrence frequency counts for at least two hashtags extracted by NLP engine 120. Although described herein as determining co-occurrence frequency counts for each of the extracted hashtags, in other implementations, co-occurrence frequency counts are determined for less than an entirety of the extracted hashtags (e.g., at least two hashtags). A co-occurrence frequency count is the number of co-occurrences of the corresponding hashtags in the social media messages. To illustrate, a co-occurrence frequency count for a first hashtag and a second hashtag is the number of individual social media messages that include both the first hashtag and the second hashtag. As a particular, non-limiting example in which there are 200 hashtags extracted by NLP engine 120, co-occurrence analyzer 122 may determine 199 co-occurrence frequency counts for each hashtag with the 199 other hashtags. To illustrate, co-occurrence analyzer 122 may determine, for the first hashtag, a first co-occurrence frequency count for the first hashtag and the second hashtag, a second co-occurrence frequency count for the first hashtag and a third hashtag, a third co-occurrence frequency count for the first hashtag and a fourth hashtag, and 196 other co-occurrence counts for the first hashtag with the remaining 196 hashtags. In this example, the first co-occurrence frequency count indicates the number of individual social media messages that include both the first hashtag and the second hashtag, the second co-occurrence frequency count indicates the number of individual social media messages that include both the first hashtag and the third hashtag, and the third co-occurrence frequency count indicates the number of individual social media messages that include both the first hashtag and the fourth hashtag. To further illustrate, if the first hashtag is included in 50 social media messages, of which 15 also include the second hashtag, 10 of which also include the third hashtag, and 2 of which also include the fourth hashtag, the first co-occurrence frequency count is 15, the second co-occurrence frequency count is 10, and the third co-occurrence frequency count is 2.

Diversity metric engine 124 may be configured to determine one or more diversity metrics for each of the hashtags extracted by NLP engine 120 (or for less than an entirety of the extracted hashtags). For example, diversity metric engine 124 may be configured to generate one or more diversity metrics that indicate a distribution of hashtags extracted by NLP engine 120 across the social media messages, with respect to other extracted hashtags, or both. The one or more diversity metrics may be based on co-occurrence frequency counts determined by co-occurrence analyzer 122, hashtag community clustering (e.g., topic clustering), and social media metadata such as date and/or time information associated with the social media messages, users that created the social media messages, or the like. For example, diversity metric engine 124 may determine the one or more diversity metrics for the hashtags based on community assignments corresponding to the hashtags, date or time information corresponding to the social media messages, user information corresponding to the social media messages, or a combination thereof. In some implementations, the diversity metrics include or correspond to the Shannon Diversity Index (SDI) calculated via Shannon entropy across one or more hashtag-related contexts. To illustrate, in some such implementations, the diversity metrics include a hashtag co-occurrence diversity metric, a community diversity metric, a month diversity metric, a year and month diversity metric, a day diversity metric, a user diversity metric, or a combination thereof. The co-occurrence diversity metric measures an amount of other hashtags that a corresponding hashtag co-occurs with in the same social media message, such that higher values indicate a hashtag co-occurs with many other hashtags. The community diversity metric measures an amount of other hashtags from other communities that a corresponding hashtag co-occurs with in the same social media message, such that higher values indicate a hashtag is more likely to occur with hashtags outside of its community (as further described herein). The month diversity metric measures an amount of different months associated with social media messages that include a corresponding hashtag, such that higher values indicate a hashtag is used year-round and lower values indicate a hashtag is more applicable to fewer months of the year. The year and month diversity metric measures an amount of different year and month combinations associated with social media messages that include a corresponding hashtag, such that higher values indicate a hashtag is consistently used despite ongoing events in the world and lower values could indicate that a hashtag is more likely to be associated with specific events. Alternatively, a year diversity metric may be used. The day diversity metric measures an amount of different days associated with social media messages that include a corresponding hashtag, such that higher values indicate a hashtag is applicable through the week and lower values indicate a hashtag is more applicable to fewer days of the week. The user diversity metric measures an amount of different users associated with social media messages that include a corresponding hashtag, such that higher values indicate a hashtag has been adopted by more users. Although six diversity metrics are described, in some other implementations, diversity metric engine 124 may be configured to determine fewer than six or more than six diversity metrics, and the diversity metrics may include other diversity metrics, such as time (e.g., hour, minute, etc.) diversity metrics, user group diversity metrics, social media platform diversity metrics, republished message diversity metrics, as non-limiting examples.

Ensemble scorer 126 may be configured to determine (e.g., calculate) an ensemble score for each hashtag for which diversity metrics are determined by diversity metric engine 124 (or for less than an entirety of the hashtags). The ensemble score for a hashtag may be a sum of the one or more diversity metrics that correspond to the hashtag, a weighted sum of the one or more diversity metrics that correspond to the hashtag, or some mathematic combination (e.g., an average, a weighted average, a mean, a median, etc.) of the one or more diversity metrics that correspond to the hashtag. In some implementations, the ensemble score determined by ensemble scorer 126 for a hashtag is the Ensemble Diversity Index (EDI) for the hashtag, and such an EDI is based on a linear combination of six diversity metrics generated by diversity metric engine 124. In some such implementations, each of the six diversity metrics are weighted according to category-specific weights that are based on multiple iterations of hashtag community hierarchy inspection. As such, the category-specific weights may be customized based on a preferred meaning of generality with respect to hashtags. In a particular, non-limiting example, the weight for the hashtag co-occurrence diversity metric is 2.0, the weight for the community diversity metric is 1.5, the weight for the year and month diversity metric is 4.0, and the weights for the other three diversity metrics (e.g., the month diversity metric, the day diversity metric, and the user diversity metric) are 1.0. These category-specific weights are illustrative, and in other implementations may have different values. Additionally or alternatively, ensemble scorer 126 may normalize any or all of the diversity metrics based on observed category-specific maximums prior to calculating the weighted sum (or the sum) as the ensemble score for the hashtag.

Ontology generator 128 may be configured to generate a hierarchical ontology based on the co-occurrence counts from co-occurrence analyzer 122, the diversity metrics from diversity metric engine 124, and the ensemble scores from ensemble scorer 126. The hierarchic ontology may be configured to hierarchically represent generality (e.g., diversity/distribution) of hashtags across different communities, different dates or times, different users, other groupings, or a combination thereof. In some implementations, the hierarchic ontology may include or correspond to (or be represented by) a graph of nodes and edges that is created based on the hashtags and the co-occurrence frequency counts. For example, ontology generator 128 may be configured to add to a graph a node corresponding to each of the hashtags and to connect nodes of hashtags that co-occur in one or more social media messages together via edges. Weights of the edges between nodes may correspond to co-occurrence frequency of the hashtags represented by the nodes. For example, a weight of an edge between a first node and a second node may correspond to the co-occurrence frequency count for a first hashtag and a second hashtag represented by the first node and the second node, respectively. In some implementations, ontology generator 128 may be configured to prune the hierarchical ontology (e.g., the graph) after the nodes and edges are added. The pruning may be based on one or more thresholds, such as a co-occurrence threshold, a user threshold, a connection threshold, or the like, or any combination thereof. As non-limiting examples, the pruning may include discarding any nodes that represent hashtags that correspond to co-occurrence frequency counts that fail to satisfy (e.g., are less than, or are less than or equal to) a co-occurrence threshold, discarding any nodes that correspond to hashtags that are adopted by a number users that fails to satisfy a user threshold, and/or discarding any nodes that correspond to hashtags that co-occur with a number of other hashtags that fails to satisfy a connection threshold. Additionally or alternatively, the pruning may include discarding all unconnected nodes (e.g., hashtags that do not occur with any other extracted hashtag).

After the nodes and edges are added to the graph (e.g., the hierarchical ontology), and option pruning is complete, ontology generator 128 may be configured to perform community detection on the graph to arrange the nodes into one or more communities (e.g., clusters) based on the weights of the edges. For example, one or more community detection processes or algorithms may be performed to assign (e.g., cluster) the nodes into multiple communities corresponding to nodes having the most edges, the strongest edges, or both (e.g., the most co-occurring hashtags), between community members. In some implementations, the community detection is performed using asynchronous label propagation. In some other implementations, other types of community detection may be performed, such as Louvain modularity or greedy modularity, as non-limiting examples. Assigning nodes to communities in this manner may establish communities of related hashtags of varying generality, such that each community may represent a different topic. Additional details of examples of community detection performed for hashtags are described further herein with reference to FIG. 3. In some other implementations, community detection may be performed based on other features instead of the weights of edges to result in communities of hashtags having different common relationships than the same topic.

After the nodes are clustered into communities, ontology generator 128 may be configured to order the nodes of each community based on the ensemble scores corresponding to the hashtags represented by the nodes. For example, communities may be organized such that a root node (e.g., a highest node) of the community is the hashtag having a highest ensemble score, and the remaining nodes are organized in order of decreasing ensemble score. Such organization may correspond to the hashtag represented by the highest node in the community being the most general (e.g., most diverse) hashtag of the community, and nodes in descending order decreasing in generality (e.g., increasing in specificity). Stated another way, hashtags represented by nodes in a community may be ordered based on diversity of the hashtags (e.g., in decreasingly diverse order). Additional details and examples of a hierarchical ontology are described further herein with reference to FIG. 4. In some implementations, information from the graph (e.g., the hierarchical ontology) may be provided by ontology generator 128 during the graph construction process to diversity metric engine 124 for use in generating one or more diversity metrics, such as community information for one or more of the hashtags for use in determining the community diversity metric. After completion of the hierarchical ontology, ontology generator 128 may be configured to output and/or store hashtag semantic data that represents the hierarchical ontology. The hashtag semantic data may be stored internally, such as at database 113, or provided to one or more external devices, such as user terminal 160. Additionally or alternatively, the hashtag semantic data may be used by other components, such as optional semantic engine 130.

In implementations in which semantic engine 130 is included in memory 112, semantic engine 130 that is configured to receive input and to perform one or more operations based on the input and the semantic data generated by ontology generator 128 (e.g., representing the hierarchical ontology). The one or more operations may include semantic processing of one or more hashtags included in the input, leveraging semantic understanding gained from the hierarchical ontology. To illustrate, semantic engine 130 may be configured to receive input data that includes a first hashtag and to output a text output that includes one or more hashtags that are hierarchically higher (i.e., that are the same or more general/diverse as represented by having higher ensemble scores) within a same community as the first hashtag in the hierarchical ontology. Due to the arrangement of the hierarchical ontology, the hashtags that are in the same community as the first hashtag and hierarchically higher are hashtags that share a same topic, while having more generality than the first hashtag. As a non-limiting example, if the first hashtag is #greatdanes, the first hashtag may be included in a community with a root node that corresponds to #dogs, and nodes that are hierarchically lower than the first hashtag within this community may include #Scooby-Doo. In this example, #dogs is more general than #greatdanes due to having a higher ensemble score, and #ScoobyDoo is less general (e.g., more specific) due to having lower ensemble scores than #greatdanes, which logically follows as Great Danes are a type of dogs (which is more specific than dogs), and Scooby Doo is a particular cartoon dog that is a Great Dane (even more specific). Identifying hashtags that are more general than the first hashtag avoids issues where the increased specificity makes the hashtags less relevant. For example, Great Danes are a type of dog, and thus #greatdanes may not be an acceptable substitute (or related hashtag) for #dogs, but Scooby Doo is a Great Dane, and thus #greatdanes may be an acceptable substitute (or related hashtag) for #ScoobyDoo.

Semantic engine 130 may be configured for a variety of use cases or purposes in generating the text output, such as providing recommendations, expanding training data, predicting trends, or the like. As an example, a user may provide an input social media message that the user is preparing to publish to semantic engine 130, and semantic engine 130 may be configured to output a recommendation for one or more additional hashtags to include in the input social media message. To illustrate, the input social media message may include a first hashtag provided by the user, and the recommendation may include one or more hashtags that share the same topic and that are more general (e.g., are the same or more general/less specific) than the first hashtag, and thus are likely to also be selected by the user for inclusion in the input social media message. To further illustrate, the input social media message may be "Can't wait to see my colleagues at the 2021 Artificial Intelligence Expo! #artificial-intelligence", and the recommendation may include "#machinelearning," "#ai," or the like, as further described with reference to FIG. 4. As another example, training data including one or more hashtags may be provided as input data to semantic engine 130, and semantic engine 130 may be configured to output expanded training data that includes the one or more hashtags and one or more related hashtags to provide more robust training data for machine learning or artificial intelligence models. To illustrate, the input data may include labeled or unlabeled training data that includes a first hashtag for use in training a machine learning model to perform one or more functions, and the expanded training data may include the first hashtag and one or more hashtags that are within a same community and hierarchically higher/have a higher ensemble score than the first hashtag (e.g., one or more hashtags that share the same topic and are the same or more general/less specific than the first hashtag), and thus are likely to be useful for providing other examples of similar hashtags for training the machine learning model. As another example, an input that includes a trending hashtag on a social media platform may be provided to semantic engine 130, and semantic engine 130 may be configured to output a prediction of additional trending hashtags on the social media platform. To illustrate, the input data may include a trending hashtag, and the prediction may include one or more hashtags that are within a same community and hierarchically higher/have a higher ensemble score than the trending hashtag (e.g., one or more hashtags that share the same topic and are the same or more general/less specific than the trending hashtag), and thus have a higher likelihood to also be relevant than other hashtags. The above examples are illustrative, and in other implementations, semantic engine 130 may be configured to perform other operations, such as predicting a topic of a social media message based on a hashtag (e.g., by identifying a root node of the community in the hierarchical ontology that includes the hashtag), identifying likely dates or times for a hashtag (e.g., based on the generality of the hashtag within a community), predicting a number of users that have adopted a hashtag (e.g., based on the generality of the hashtag within a community and based on user information of other hashtags within the community), or the like. In some other implementations, memory 112 does not include semantic engine 130, and the hashtag semantic data output by ontology generator 128 may be provided to one or more other devices, such as user terminal 160, for performance of one or more of the operations described with reference to semantic engine 130.

The database 113 may be coupled to NLP engine 120, co-occurrence analyzer 122, diversity metric engine 124, ensemble scorer 126, ontology generator 128, semantic engine 130, or a combination thereof. In some implementations, database 113 is configured to store hashtag semantic data, hierarchical ontologies, hashtags, co-occurrence frequency counts, diversity metrics, ensemble scores, thresholds, received input data, other information, etc., or any combination thereof. Additionally or alternatively, information stored at database 113 may be provided to one or more external devices, such as user terminal 160, via network 180.

Figure 2:
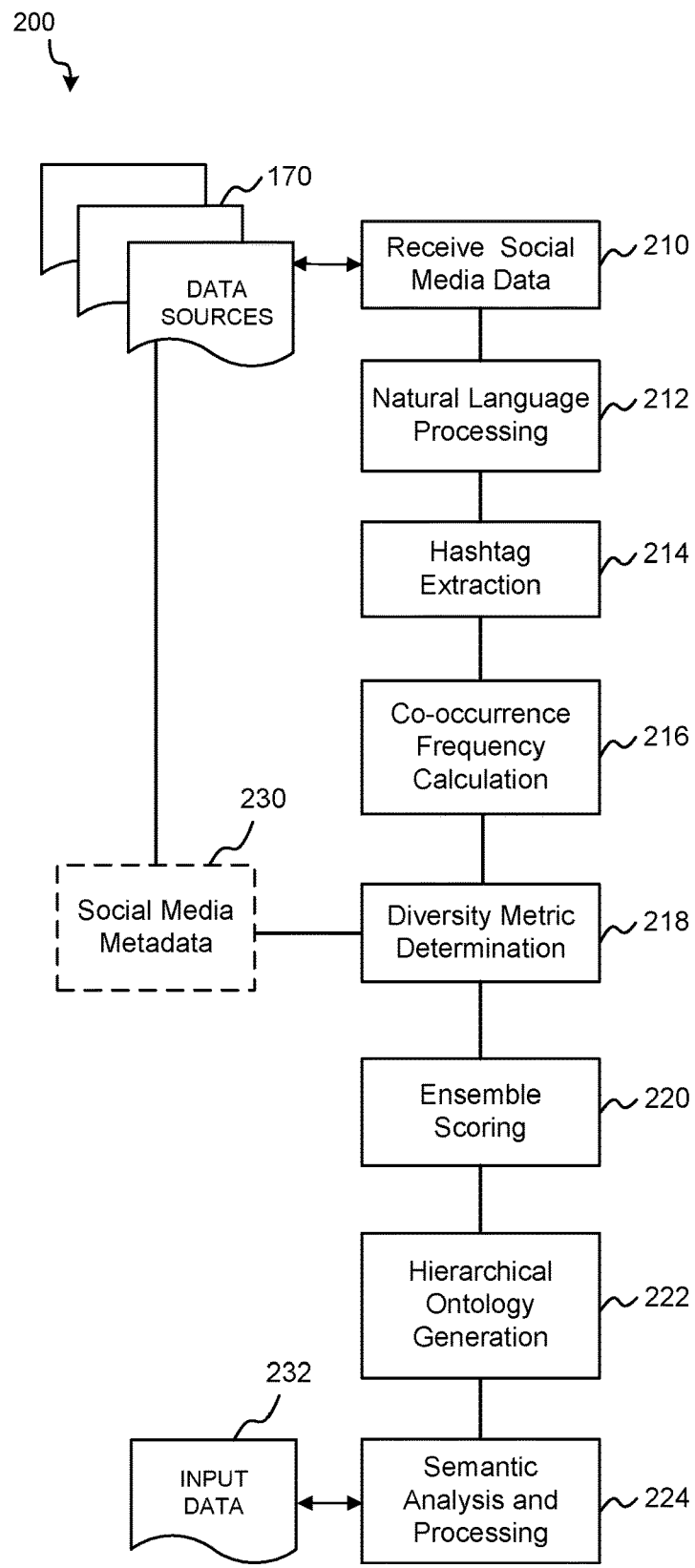
FIG. 2 is a flow diagram illustrating functionality of the system of FIG. 1 according to one or more aspects.

The functionality of server 110 will now be discussed with respect to the flow diagram illustrated in FIG. 2. FIG. 2 shows a flow diagram illustrating functionality of system 100 for determining semantic relationships, indicated by hierarchical ontologies, of hashtags in social media data. Blocks of method 200 illustrated in FIG. 2 may be performed by one or more components of system 100 of FIG. 1. For example, blocks 210, 212, and 214 may be performed by NLP engine 120, block 216 may be performed by co-occurrence analyzer 122, block 218 may be performed by diversity metric engine 124, block 220 may be performed by ensemble scorer 126, block 222 may be performed by ontology generator 128, and block 224 may be performed by semantic engine 130.

At block 210, social media data is received (e.g., at a receiver). For example, the social media data may include or correspond to multiple social media messages and may be received from data sources 170. The social media data may correspond to one or more social media platforms (e.g., websites, apps, etc.). At block 212, NLP is performed on the social media data. For example, NLP engine 120 may perform one or more NLP operations on the social media data to generate processed social media data (e.g., NLP data). Performing NLP operations may identify and subdivide social media messages into tokens, phrases, sentences, other elements, or the like. In some implementations, the NLP may include optional pre-processing operations to format and/or otherwise prepare the social media data for natural language processing.

At block 214, hashtags are extracted from the social media data. For example, NLP engine 120 may identify multiple hashtags (e.g., combinations of alphanumeric characters preceded by the "#" character) within the processed social media data, and the identified hashtags may be extracted for use in performing downstream operations. The extraction and the NLP operations may be performed using one or more NLP algorithms or operations, one or more machine learning models or artificial intelligence modules, or any other NLP and feature extraction techniques. In some implementations, identifiers of the social media messages from which the hashtags are extracted may be associated with the hashtags for use in identifying related metadata in one or more downstream operations (or the metadata may be identified and associated with the hashtags during/after extraction).

At block 216, co-occurrence frequency counts are determined for each of at least two of the hashtags extracted by NLP engine 120 and other hashtags of the extracted hashtags. For example, co-occurrence analyzer 122 may determine (e.g., count) one or more co-occurrence frequency counts for a hashtag with one or more other hashtags by counting the number of individual social media messages that include both the hashtag and another hashtag. To illustrate, co-occurrence analyzer 122 may determine a first co-occurrence frequency count for a first hashtag and a second hashtag as the number of individual social media messages that include both the first hashtag and the second hashtag, and a second co-occurrence frequency count for the first hashtag and a third hashtag may be determined as the number of individual social media messages that include both the first hashtag and the third hashtag. Stated another way, a co-occurrence frequency count for any two hashtags (e.g., any pair of hashtags) represents a count of individual social media messages that include both the two hashtags (e.g., the pair of hashtags).

At block 218, diversity metrics are performed for the at least two hashtags (e.g., some or all of the extracted hashtags). The diversity metrics indicate a distribution (e.g., diversity) of the at least two hashtags across the social media messages, with respect to other hashtags, or both. For example, for example, diversity metric engine 124 may determine one or more diversity metrics for each hashtag that it processes. In some implementations, the one or more diversity metrics for a hashtag are based on the co-occurrence frequency counts that correspond to the hashtag and other hashtags, a community assignment corresponding to the hashtag within a graph representing a hierarchical ontology, date or time information corresponding to the social media messages, user information corresponding to the social media messages, or a combination thereof. To illustrate, social media metadata 230 that corresponds to the social media data received by NLP engine 120 may be used to determine information corresponding to the social media messages that include the extracted hashtags. For example, the social media metadata 230 may include dates and/or times social media messages are published, users associated with the social media messages (e.g., users that publish the social media messages, that "like" (or otherwise react to) the social media messages, users that re-publish the social media messages, etc.), user groups associated with the social media messages, locations of users at the time the social media messages are published, other information, or a combination thereof. The diversity metrics may be determined based on this information and the co-occurrence frequency counts and the community information. For example, the diversity metrics for a hashtag may be determined based on the co-occurrence frequency counts that correspond to the hashtag and are output by co-occurrence analyzer 122, community information that corresponds to the hashtag and that is output by ontology generator 128, and/or portions of social media metadata 230 that correspond to social media messages that include the hashtag.

In some implementations, the one or more diversity metrics may include one or more of the following six diversity metrics: a hashtag co-occurrence diversity metric, a community diversity metric, a month diversity metric, a year and month diversity metric, a day diversity metric, and a user diversity metric. In other implementations, the one or more hashtags may include more than six or fewer than six diversity metrics and/or may include different diversity metrics than these six diversity metrics. These six diversity metrics may be determined based on this information and the co-occurrence frequency counts and the community information To illustrate, the hashtag co-occurrence diversity metric for a hashtag may be determined based on an amount of other hashtags that co-occur in social media messages with the hashtag. The community diversity metric for a hashtag may be determined based on an amount of hashtags from other communities that co-occur in social media messages with the hashtag. The month diversity metric for a hashtag may be determined based on an amount of different months during which social media messages that include the hashtag are published. The year and month diversity metric for a hashtag may be determined based on an amount of different year and month combinations during which social media messages that include the hashtag are published. The day diversity metric for a hashtag may be determined based on an amount of different days during which social media messages that include the hashtag are published. The user diversity metric for a hashtag may be determined based on an amount of different users associated with social media messages that include the hashtag, such as users that publish or re-publish (e.g., "re-tweet") the social media messages, users that react to (e.g., "like") or otherwise interact with the social media messages, or the like.

At block 220, ensemble scores are determined (e.g., calculated) for the at least two hashtags (e.g., some or all of the hashtags extracted by NLP engine 120). For example, ensemble scorer 126 may determine an ensemble score for a hashtag based on a combination of the one or more diversity metrics that correspond to the hashtag. In some implementations, the ensemble score for a hashtag is a sum, or a weighted sum, of the one or more diversity metrics that correspond to the hashtag. Additionally or alternatively, the ensemble score for a hashtag may be determined based on normalized versions of the one or more diversity metrics. As a particular, non-limiting example, ensemble scorer 126 may normalize each of the one or more diversity metrics for a hashtag based on category-specific maximums to generate one or more normalized diversity metrics for the hashtag. To illustrate, normalizing a value of a co-occurrence diversity metric may include dividing the value of the co-occurrence diversity metric by a maximum observed co-occurrence diversity metric value, which may be preset at ensemble scorer 126 and optionally updated during operation if higher values of the co-occurrence diversity metric are determined. In this example, after normalizing the diversity metrics, ensemble scorer 126 may apply category-specific weights to the one or more normalized diversity metrics to generate one or more weighted diversity metrics. The category-specific weights may be preset at ensemble scorer 126 and based on multiple iterations of hashtag community hierarchy inspection, a desired definition of diversity, target metrics, or the like. After applying the category-specific weights, ensemble scorer 126 may determine a sum (e.g., a weighted sum) of the one or more weighted diversity metrics, and the weighted sum is output as the ensemble score for the hashtag. In this manner, ensemble scorer 126 may determine (e.g., calculate) an EDI for each of at least two hashtags based on one or more SDIs corresponding to the hashtag. As described above, these ensemble scores (e.g., EDIs) represent generality (i.e., diversity) of the corresponding hashtags, in some implementations based on Shannon entropy.

At block 222, a hierarchical ontology is generated for the at least two hashtags (e.g., some or all of the extracted hashtags) based on the co-occurrence frequency counts and ensemble scores that correspond to the at least two hashtags. For example, ontology generator 128 may generate a hierarchical ontology of hashtags that groups (e.g., clusters) hashtags by topic (e.g., based on co-occurrence frequency counts) and that orders hashtags within groups based on generality (e.g., based on ensemble scores). In some implementations, the hierarchical ontology includes or corresponds to a graph (or graphical representation) of hashtags and their co-occurrence relationships. To illustrate, ontology generator 128 may generate a graph of nodes and edges based on the hashtags and the co-occurrence frequency counts. In the graph, nodes correspond to hashtags (and optionally information about the hashtags, such as a count of social media messages that include the hashtag, dates or times that social media messages that include the hashtag are published, users associated with the hashtag, and the like) and edges (e.g., connections) between nodes indicate that the connected nodes correspond to hashtags that co-occur in at least one social media message. Weights of the edges may correspond to co-occurrence frequency of the hashtags represented by the nodes. Examples of graphs of nodes and edges are further described herein with reference to FIGS. 3 and 4.

In some implementations, after adding the nodes and edges, ontology generator 128 may prune the hierarchical ontology based on threshold(s) such as a co-occurrence threshold, a user threshold, a connection threshold, or the like. Pruning the hierarchical ontology may be performed by discarding nodes (and related information) from the graph that fail to satisfy one or more of the thresholds, thereby decreasing the complexity of the graph and the processing and memory resources used with respect to the hierarchical ontology. For example, nodes that are not connected to any other nodes (e.g., nodes for which a number of connections fails to satisfy a connection threshold) may be discarded. As another example, nodes that correspond to hashtags that do not co-occur with a threshold number of other hashtags (e.g., nodes for which a maximum co-occurrence frequency count fails to satisfy a co-occurrence threshold) may be discarded. As another example, nodes that correspond to hashtags that published by fewer than a threshold number of users (e.g., nodes for which an associated user count fails to satisfy a user threshold) may be discarded.

After nodes for the hashtags are added to the graph, and optional pruning is performed, ontology generator 128 may perform community detection on the graph to arrange (e.g., cluster) the nodes into one or more communities based on the weights of the edges. For example, community detection may cluster nodes into groups (e.g., communities) such that hashtags represented by nodes of a community have high co-occurrence frequency counts with one or more other hashtags of the community. This community detection and organization (e.g., clustering) results in the graph being arranged into multiple communities of different topics (e.g., the hashtags of each community are related to the same corresponding topic or generalized concept). An example of such community detection and clustering is further described herein with reference to FIG. 3. After the communities are formed, ontology generator 128 may order the nodes of each of the communities based on the ensemble scores corresponding to the hashtags represented by the nodes of the communities. For example, for each community, the node corresponding to the hashtag with the highest ensemble score of all hashtags in the community may be configured as the root node (e.g., a first or hierarchically highest hashtag) of the community, and the remaining nodes may be ordered in a particular direction in decreasing order of ensemble score. As a result, in a three-dimensional graph, higher located nodes correspond to hashtags with higher ensemble scores (e.g., more general/diverse or less specific hashtags), and lower located nodes correspond to hashtags with lower ensemble scores (e.g., less general/diverse or more specific hashtags). As such, the location of nodes within a community relative to the other nodes of the community in a particular direction represents the increasing (or decreasing) generality/diversity of the corresponding hashtags. An example of a hierarchically ordered graph is described further herein with reference to FIG. 4.

After generation of the hierarchical ontology, data representing the hierarchical ontology may be stored or output for use in other operations or for use by other devices. To illustrate, hashtag semantic data representing the hierarchical ontology may be stored, also at block 222, for later use and/or may be output to downstream components or to external devices. For example, ontology generator 128 may store hashtag semantic data representing the hierarchical ontology, such as at database 113. Additionally or alternatively, the hashtag semantic data may be transmitted to an external device, such as user terminal 160. Additionally or alternatively, ontology generator 128 may output the hashtag semantic data to other components, such as semantic engine 130, for use in performance of one or more operations described herein.

At block 224, optional semantic analysis and processing may be performed based at least in part on the hierarchical ontology represented by the semantic data output or stored by ontology generator 128. For example, semantic engine 130 may receive input data 232, process hashtag(s) included in input data 232 based on the hierarchical ontology represented by the hashtag semantic data to identify one or more other hashtags that are hierarchically higher/have a higher ensemble score within a same community as the hashtag(s), and output a text output (or other type of output) that includes the one or more identified hashtags. The output may be used as part of prediction, suggesting, forecasting, dataset expansion, or other operations that leverage semantic understanding of hashtags to provide automatic outputs of semantically relevant information. As an example, semantic engine 130 may receive an input social media message that includes a first hashtag and may identify, based on the hashtag semantic data, one or more hashtags that are hierarchically higher/have a higher ensemble score within the same community in the hierarchical ontology as the first hashtag. Semantic engine 130 may also output a recommendation for additional hashtags to include in the input social media message, with the recommendation including the one or more hashtags identified from the hierarchical ontology. As another example, semantic engine 130 may receive training data that includes a first hashtag (or multiple hashtags) for use in training a machine learning model or artificial intelligence module. In this example, semantic engine 130 may identify, based on the hashtag semantic data, one or more hashtags that are hierarchically higher/have a higher ensemble score within the same community in the hierarchical ontology as the first hashtag. Semantic engine 130 may also output expanded training data that includes the first hashtags and the one or more hashtags identified from the hierarchical ontology for use in providing more robust training of the machine learning model or artificial intelligence module. As another example, semantic engine 130 may receive a trending hashtag and may identify, based on the hashtag semantic data, one or more hashtags that are hierarchically higher/have a higher ensemble score within the same community in the hierarchical ontology as the trending hashtag. Semantic engine 130 may also output a prediction of additional trending hashtags that includes the one or more hashtags identified from the hierarchical ontology. These examples are illustrative, and other prediction, forecasting, data expansion, or other types of operations based on the hierarchical ontology are contemplated by aspects of the present disclosure.

As described with reference to FIGS. 1-2, system 100 (e.g., server 110) and its corresponding operations and functions determine semantic relationships of hashtags in social media data. For example, system 100 is configured to perform NLP operations on social media to extract hashtags, and to generate a hierarchical ontology of at least two hashtags based on co-occurrence frequency counts and one or more diversity metrics for the hashtags. The hierarchical ontology generated by ontology generator 128 is a static, semantically consistent hierarchy of hashtags that takes into account the generality or specificity of hashtag use in social media messages. Additionally, the hierarchical ontology supports analysis and semantic processing operations that are generality-aware, such as operations performed by semantic engine 130, unlike other ephemeral folksonomies that provide little to no semantic analysis value. Further, because the hierarchical ontology is based on co-occurrence frequency counts determined by co-occurrence analyzer 122, instead of merely co-occurrence counts (e.g., counts of how many other hashtags co-occur with a hashtag), the hierarchical ontology generated by ontology generator 128 takes into account both generality and popularity (e.g., across different communities/topics, different dates/times, different users, and the like), as well as the distribution of co-occurrences. As such, the hierarchical ontology generated by ontology generator 128 provides predictive value for other co-occurring features, such as topics, users, posting times, other hashtags, and the like, which is leveraged by semantic engine 130. Thus, it should be appreciated that the techniques described with reference to FIGS. 1-2 provide a technical solution to technical problems existing in conventional industry practices of social media analysis and semantic structure formation, particularly with relation to hashtags. Furthermore, system 100 and method 200 implement a distinct process and a particular implementation that provide an improvement to existing computer systems by providing system 100 with new capabilities and functionality for determining co-occurrence frequency counts, diversity metrics, and ensemble scores for hashtags extracted from social media data, and for generating hierarchical ontologies that provide improved semantic analysis of hashtags in social media messages. These improvements result in more predictively useful semantic structures for analyzing and processing hashtags, resulting in more robust operations such as predictions or input expansion, that are not possible with conventional automatic semantic analysis systems, and these benefits are provided with reduced costs and reduced processing resource usage than manually defining a gold standard taxonomy.

Figure 3:
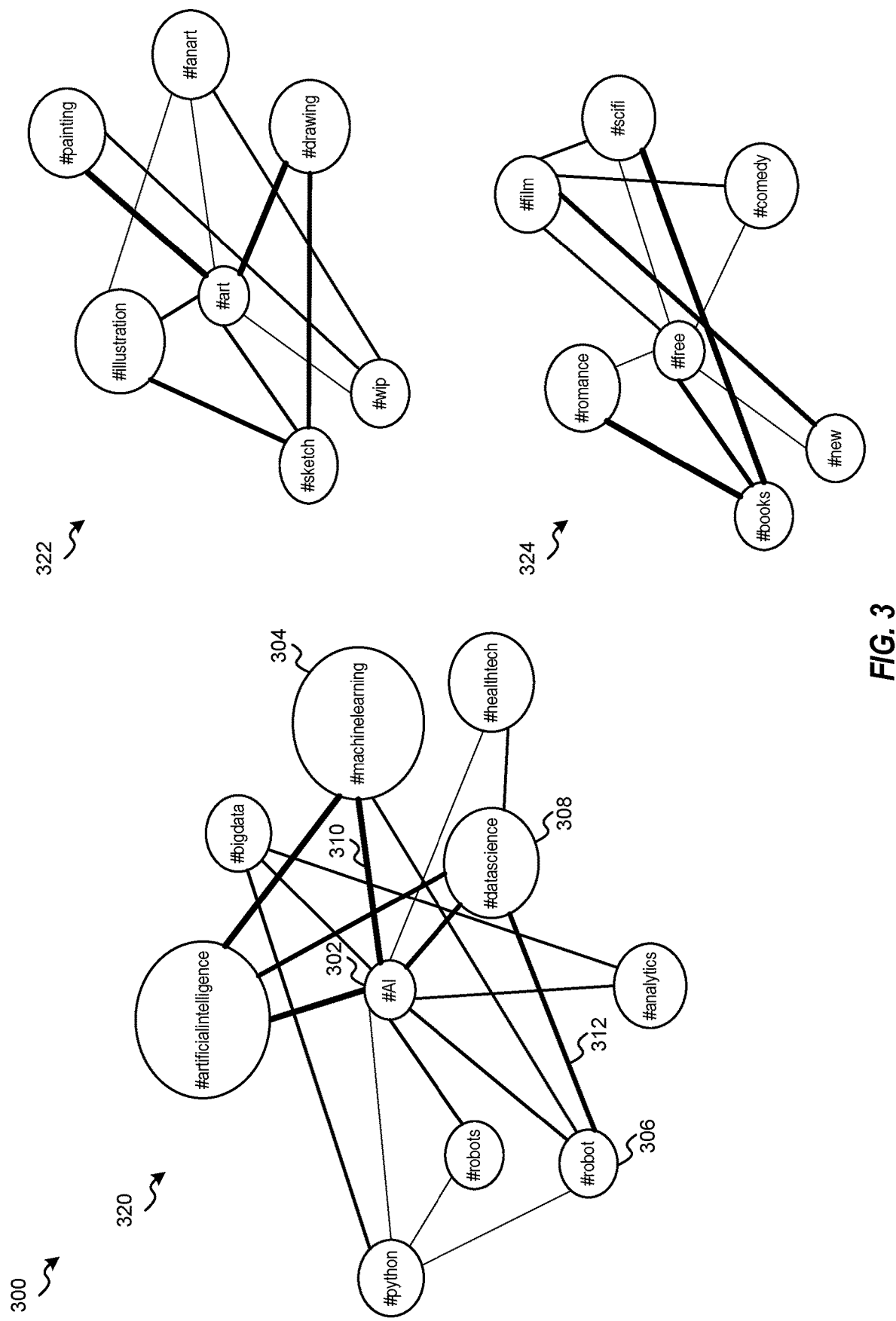
FIG. 3 is a diagram of an example of a graph representing relationships of hashtags based on co-occurrence frequency according to one or more aspects.

Referring to FIG. 3, an example of a graph representing relationships of hashtags based on co-occurrence frequency according to one or more aspects is shown as a graph 300. Graph 300 is an illustrative example of a hierarchical ontology of hashtags prior to completion of the process (e.g., prior to ordering based on diversity metrics). In some implementations, graph 300 may include or correspond to the graph created during one or more operations of the hierarchical ontology generation process described with reference to ontology generator 128 of FIG. 1.

To generate graph 300, nodes corresponding to hashtags extracted from a plurality of social media messages are added to graph 300. For example, each node may correspond to a hashtag (and optionally information associated with the hashtag, such as occurrence counts, user counts, dates, times, reactions, republishing counts, or the like). Additionally, edges are added to connect any nodes that correspond to hashtags that co-occur in at least one social media post. Weights of the edges correspond to co-occurrence frequency of the hashtags corresponding to the connected nodes. To illustrate, graph 300 includes a plurality of nodes and a plurality of edges, including illustrative nodes (e.g., a first node 302, a second node 304, a third node 306, and a fourth node 308) and illustrative edges (e.g., a first edge 310 and a second edge 312). First node 302 may correspond to the hashtag "#AI", second node 304 may correspond to the hashtag "#machinelearning," third node 306 may correspond to the hashtag "#robot,", and fourth node 308 may correspond to the hashtag "#datascience." First node 302 is connected to second node 304 by first edge 310, and a weight (represented in FIG. 3 by a thickness of first edge 310) of first edge 310 represents the co-occurrence frequency of "#AI" and "#machinelearning" (e.g., the number of unique social media messages that include both "#AI" and "#machinelearning"). Third node 306 is connected to fourth node 308 by second edge 312, and a weight of second edge 312 represents the co-occurrence frequency of "#robot" and "#datascience" (e.g., the number of unique social media messages that include both "#robot" and "#datascience"). As can be seen in FIG. 3, the co-occurrence frequency of "#AI" and "#machinelearning" is greater than the co-occurrence frequency of "#robot" and "#datascience", based on the weights of first edge 310 and second edge 312, respectively.

After the nodes and edges are added to graph 300, and optional pruning is performed, community detection may be performed to arrange (e.g., cluster) the nodes into multiple groups (e.g., communities). The community detection may be performed based on co-occurrence frequency, such that each community includes nodes that have higher co-occurrence frequencies with other nodes of the community than with nodes of other communities. For example, graph 300 may be organized into a first community 320, a second community 322, and a third community 324. The community detection may be performed using one or more community detection techniques, such as asynchronous label propagation, as Louvain modularity, or greedy modularity, as non-limiting examples. Each node of a community may correspond to a hashtag that co-occurs with at least one other node of the community. For example, first community 320 may include first node 302, second node 304, third node 306, and fourth node 308 because the hashtag corresponding to first node 302 co-occurs with each of the hashtags corresponding to nodes 304-308. Nodes of each community may be connected to one other node in the community, or to more than one other node in the community. For example, third node 306 is connected to first node 302 and to fourth node 308. Additionally, a node of one community may be connected to a node in a different community (e.g., due to the corresponding hashtags co-occurring in one or more social media messages), which is not shown in FIG. 3 for ease of illustration.

Due to the communities in graph 300 being based on co-occurrence frequency, each of the communities of hashtags are semantically related and are of varying generality. Thus, each community may represent a different topic. For example, first community 320 may represent a topic related to the hashtags "#AI", "#bigdata," "#machinelearning," "#artificialintelligence," "#robots," "#healthtech," "#datascience," "#analytics," "#robot," and "#python" that correspond to the nodes of first community 320. Similarly, second community 322 may represent a topic related to the hashtags "#art," "#fanart," "#illustration," "#drawing," "#sketch," "#wip," and "#painting" that correspond to the nodes of second community 322. Similarly, third community 324 may represent a topic related to the hashtags "#free," "#new," "#comedy," "#books," "#romance," "#film," and "#scifi" that correspond to the nodes of third community 324.

Figure 4:
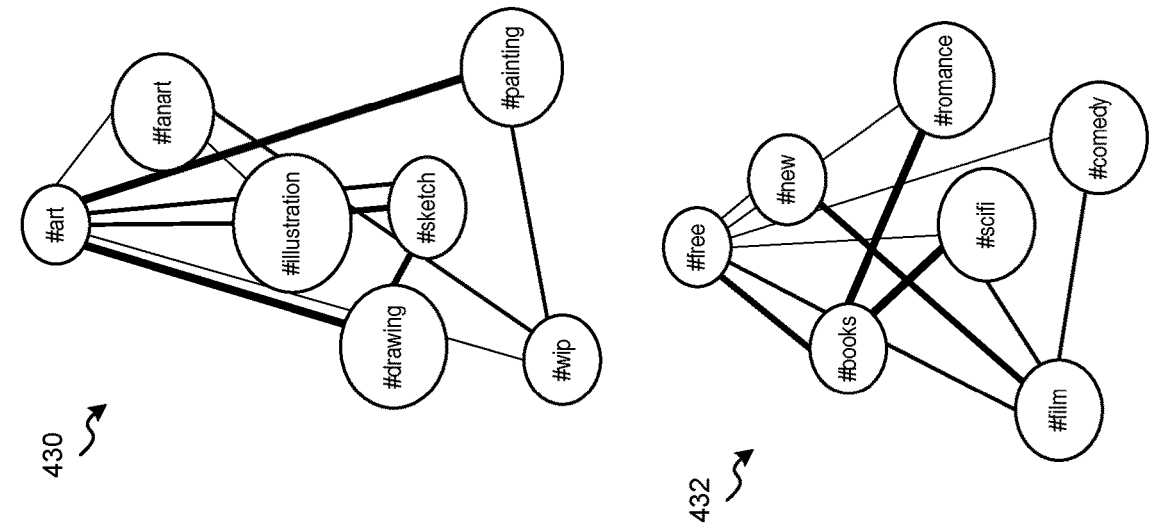
FIG. 4 is a diagram of an example of a graph representing a hierarchical ontology of hashtags according to one or more aspects.
Figure 4:
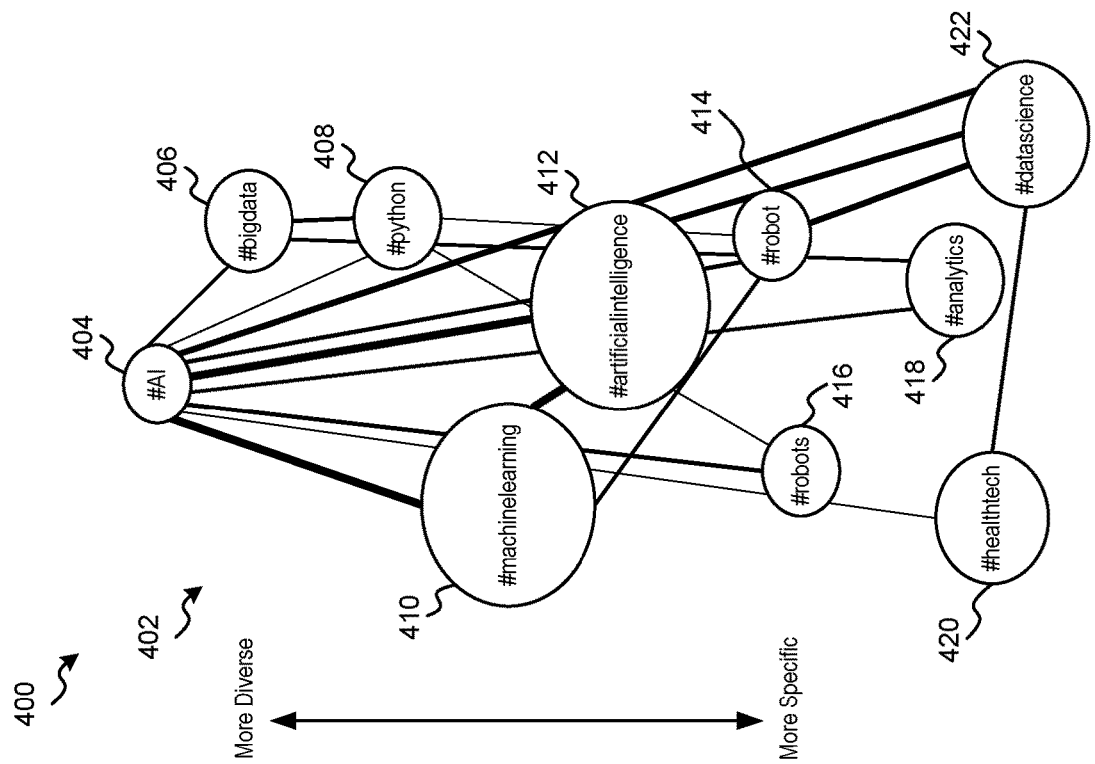

Referring to FIG. 4, an example of a graph representing a hierarchical ontology of hashtags according to one or more aspects is shown as a graph 400. Graph 400 is an illustrative example of a hierarchical ontology of hashtags upon completion arranging (e.g., clustering) and ordering. In some implementations, graph 400 corresponds to graph 300 of FIG. 3 after performance of one or more additional operations.

Graph 400 includes nodes and connecting edges, similar to as described with reference to FIG. 3. After the nodes have been organized (e.g., clustered) into communities using community detection, such as first community 402, second community 430, and third community 432, the nodes of each community are hierarchically arranged. Although three communities are shown in FIG. 4, in other examples, there may be more than three or fewer than three communities of nodes based on community detection. This ordering is based on corresponding ensemble scores, which indicate a generality (e.g., a diversity) of each corresponding hashtag. Although nodes in FIG. 4 are illustrated as only being connected to other nodes in the same community, this is for ease of illustration, and node(s) in one community may be connected to node(s) in other communities. In the example shown in FIG. 4, nodes are ordered in a direction from top to bottom in order of decreasing generality/diversity (i.e., increasing specificity). To illustrate, the highest node in each of the communities 402, 430, and 432 may be ordered as a root node that represents the most general/diverse hashtag of the community, and descending nodes represent less diverse (e.g., more specific) hashtags in the community. As such, the hashtag that corresponds to the root node (e.g., the highest node) may correspond to or be the best indicator of a general topic for the community. For the example shown in FIG. 4, up/higher corresponds to more diverse hashtags having higher ensemble scores, down/lower corresponds to more specific (e.g., less diverse) hashtags having lower ensemble scores, and left and right position does not have meaning, except for a hashtag's proximity to other hashtags within that community.

To illustrate with reference to the example shown in FIG. 4, first community includes a first node 404 ("#AI"), a second node 406 ("#bigdata"), a third node 408 ("#python"), a fourth node 410 ("#machinelearning"), a fifth node 412 ("#artificialintelligence"), a sixth node 414 ("#robot"), a seventh node 416 ("#robots"), an eighth node 418 ("#analytics"), a ninth node 420 ("#healthtech"), and a tenth node 422 ("#datascience"). First node 404 may be a root node, and thus the corresponding first hashtag ("#AI") may be the most general hashtag in first community 402 (e.g., "#AI" may be most representative of a topic of first community 402). Hashtags corresponding to nodes 406-412 may be less general (e.g., more specific) than the hashtag corresponding to first node 404 because these nodes are located lower in graph 400 than first node 404. For example, second node 406 may be located below first node 404 because the ensemble score corresponding to the hashtag represented by second node 406 ("#bigdata") is less than the ensemble score corresponding to the hashtag represented by first node 404 ("#AI"). Similarly, hashtags corresponding to nodes 414-422 may be less general/more specific than the hashtags corresponding to nodes 406-412 because these nodes are located lower in graph 400 than nodes 406-412. For example, eighth node 418 may be located below fifth node 412 because the ensemble score corresponding to the hashtag represented by eighth node 418 ("#analytics") is less than the ensemble score corresponding to the hashtag represented by fifth node 412 ("#artificialintelligence"). Second community 430 and third community 432 may be similarly ordered by based on ensemble scores, with the root node of second community 430 corresponding to the hashtag "#art" and the root node of third community 432 corresponding to the hashtag "#free."

To investigate aspects of the present disclosure, Twitter data was relied upon to create a hierarchy of English language hashtags. The generation process included: (1) Hashtag graph construction; (2) Community detection based on hashtag co-occurrences; (3) Shannon Diversity Index (i.e. entropy) calculation for the six diversity measures of Hashtag Co-occurrence, Community, Month-of-Year, Year-and-Month, Day-of-Week, and User; and (4) Novel Ensemble Diversity Index (EDI) calculation by linear weighted combination of the six diversity measures in (3).

Twitter "Spritzer" streams (a.k.a. "Sample" streams) were collected from the Internet Archive (archive.org) for July 2017-June 2020, as well as for October-December of 2016 as a substitute for the October-December 2019 period unavailable on the Internet Archive. Broadly, this data covered a random 1% of Twitter posts from 36 months, with sporadic daily exceptions due to data availability. The analysis was limited to English language hashtags—indicated by metadata, rejection of non-Latin characters, etc. Unicode hashtags (e.g. emojis) were not captured. The dataset was further limited to tweets with two, three, or four hashtags (two is minimally required for co-occurrences, and four was chosen as a limit to reduce spam tweets). 259,642 tweets from the original 47,530,112 (0.55%) tweets with more than one hashtag were from purported bots and thus excluded (using a compiled list from botometer.osome.iu.edu/bot-repository/datasets.html). Additionally, any tweets from a user id that matched one of the 77,508 accounts listed within the available data sets were excluded from further processing. A further 6,286,245 tweets (13.2%) had more than four hashtags and were excluded. 40,984,225 eligible tweets from 8,148,904 unique user accounts remained in the data set after the reduction. The above-described data set reduction was chosen for convenience and is not intended to be limiting.

The data was represented as an undirected graph using NetworkX Python package (v.2.5), as a non-limiting example of graphing software. Nodes of the graph represent the unique, lower-cased hashtags encountered in the data set, and edges represent co-occurrences. Each hashtag node recorded: (1) the total number of tweets with the hashtag; (2) the number of uses within each year-and-month combination; (3) the number of uses by month of the year, (4) the number of uses by each user account; and (5) the number of uses by day of the week. Each edge's weight is a count of the number of co-occurrences between the two connected hashtags. These five node metrics plus one edge metric are the bases for the six measures of diversity discussed herein. After all hashtag data was inserted into a graph, edges and nodes were pruned in the following sequence: (1) all edges of weight less than 6 (approximately 2 co-occurrences per year) and all hashtag nodes used by only one user; and (2) all unconnected nodes. Pruning operations were intended to increase user agreement of the folksonomy and decrease processing time. In other implementations, other metrics and pruning operations may be used. 370,105 hashtag nodes and 1,340,171 co-occurrence edges remained after the pruning and cleaning.

Several community detection methods were explored, including Louvain modularity and greedy modularity, but asynchronous label propagation was selected as it had the lowest number of counterintuitive communities. The asyn_lpa_communities( ) function from the NetworkX was used to generate communities and was provided a seed value of one for consistent community assignments during the analysis.

The Shannon Diversity Index for each of the hashtag contexts was calculated via Shannon entropy according to the following:

$$H_s(X) = -\sum_{i=1}^{n} P(X_i)\log_2 P(X_i)$$

where the domain of X changes, depending on context diversity h, c, m, l, w, u, where $P(X_i)$ is the probability of a hashtag:
1. Hashtag Co-occurrence Diversity (h)
   co-occurring with another hashtag i in the same tweet. Higher values indicate a hashtag co-occurs with many other hashtags.
2. Community Diversity (c)
   co-occurring with hashtags from community i. Higher values indicate a hashtag is more likely to occur with hashtags outside of its community.
3. Month-of-Year Diversity (m)
   occurring during month i. Higher values indicate a hashtag is used year-round. Lower values indicate a hashtag is more applicable to fewer months of the year.
4. Year-and-Month Diversity (t)
   occurring during a specific year-and-month i. Higher values indicate a hashtag is consistently used, despite ongoing events in the world. Lower values could indicate a hashtag is more likely to be associated with specific events.
5. Day-of-Week Diversity (w)
   occurring on day of the week i. Higher values indicate a hashtag is applicable throughout the week. Lower values indicate a hashtag is more applicable to fewer days of the week.
6. User Diversity (u)
   being used by user i. Higher values indicate a hashtag has been adopted by more users.

The Ensemble Diversity Index (EDI) for each hashtag is a linear combination of its six diversity measures. Each of the six measures per hashtag is normalized by the observed maximum SDI for that category, and then weighted according to the following:

$$H_\Sigma(i) = 2\frac{H_h(i)}{H_{max_h}} + 1.5\frac{H_c(i)}{H_{max_c}} + \frac{H_m(i)}{H_{max_m}} + 4\frac{H_t(i)}{H_{max_t}} + \frac{H_w(i)}{H_{max_w}} + \frac{H_u(i)}{H_{max_u}}$$

The weighting scheme in this analysis was objectively determined through a modified version of the entropy weight method. However, given that any folksonomy hierarchy may be ephemeral, this method is a non-limiting example and users may choose other methods of weight determination, either objectively or subjectively determined.

Objective measurement of the correctness of a folksonomy hierarchy may be challenging, but it is noted that this approach withstands scrutiny through theoretical argument and quantitative and qualitative analyses. Theoretically, when a hashtag has a higher diversity measure for one of the six domains, then by definition it was applied in more diverse circumstances within that domain than a hashtag with a lower diversity measure. To explore the results quantitatively, differences between the highest rank hashtags were compared between the EDI hierarchy and a hierarchy generated through degree co-occurrence ranking in a community-agnostic manner (for a more direct comparison). Further, the hashtags that have the highest diversity measure scores for each of the six domains are illustrated. Qualitatively, the resulting hierarchy for an illustrative hashtag, in this case the #ai hashtag, could be visualized, as well as its immediate community neighborhood.

Additional perspectives on a hashtag's generality include the character length of the hashtag and whether the hashtag has an English language counterpart. Although neither of these aspects were included as features in the hierarchy generation process, these respective statistics between the degree co-occurrence rankings and the EDI rankings were investigated—a good proxy of hashtag simplicity and acceptance. First, two rank-ordered sets of hashtags were created and sorted: one by degree co-occurrence and one by EDI. Then the number of characters in each hashtag were counted and it was determined whether each word was a dictionary word.

A hashtag was identified as a dictionary word if it had at least one synset representation in WordNet using the NLTK Python library (v.3.5). For example, #fearless has two synset representations, but #befearless has zero. Then the proportion of hashtags that had at least one synset representation were investigated in rank-decreasing order. Because many more hashtags share lower degrees of co-occurrence, combining them into one rank may not adequately reveal their relative weight as compared to the much fewer hashtags with higher degrees of co-occurrence. Therefore, a tumbling average of 1000 hashtags was used for proportion of degree rank dictionary word hashtags, which also represented the continuous rank representation of EDI with fidelity. Then the mean and median rank of English language dictionary words were determined for EDI rank, and then for degree co-occurrence, by performing twenty iterations (with mean values) of randomization of the degree rank among same-degree hashtags. In other cases where a direct comparison between the degree and EDI ranking was desired, equivalent degree rankings were assigned to hashtags ordered by their EDI ranking. To accomplish this, the EDI-ordered list of hashtags was mapped to the ordered list of degree rankings and assigned the degree rank from the second list to the hashtags in the first list, so that there are an equal number of hashtags of each rank for each paradigm.

370,105 hashtags were extracted from 40,984,225 tweets and assigned to 36,975 hashtag communities. The results of applying the EDI method to this data are presented to discuss the following qualitative and quantitative assessments: (1) the tightness of created communities at the individual and group level of community; (2) the expression of diversity in the hashtags; (3) comparisons of EDI to degree rank; and (4) other intrinsic observations.

Term co-occurrence is taken as an indication of semantic "closeness" and has proven useful in the context of hashtags in other studies. The EDI hashtag communities appear semantically consistent as demonstrated by the top (most diverse) and bottom (least diverse) five hashtags for four communities containing the seed hashtags #ai, #beer, #coffee, and #dogs—few hashtags are obviously out of place. Top and bottom hashtags in multiple categories are shown in Table 1 below. Each of the top five most diverse hashtags in these communities appear related to the seed hashtag.

TABLE 1

Hashtag Community Examples (n = number of community hashtags)

| Seed Hashtag | #ai (n = 1059) | #beer (n = 184) | #coffee (n = 199) | #dogs (n = 827) |
|---|---|---|---|---|
| Top Five Most Diverse Hashtags in Seed Hashtag Community | ai<br>bigdata<br>python<br>machinelearning<br>artificialintelligence | beer<br>craftbeer<br>homebrew<br>ipa<br>beeroclock | coffee<br>tea<br>coffeetime<br>mug<br>cafe | cute<br>dogs<br>animals<br>dog<br>dogsoftwitter |
| Top Five Least Diverse Hashtags in Seed Hashtag Community | diango<br>wiml2016<br>hpcmeetsai<br>panspandasuk<br>alexaconf2019 | tryanuary<br>50thandfrance<br>fizzics<br>sharethebeerlove<br>thetweetinn | pumpkinpiespice<br>pourfection<br>withenoughcoffeeican<br>meethesekuchzyaada<br>reesespbcreamer | amazonwooffest18<br>britainsfavouritedogs<br>soththumootai<br>puppyfirstlook<br>boxerfirstlook |

This perspective on consistency is additionally supported by visualization. For the particular results described herein, a custom anti-gravity+spring simulation was written which allowed free movement on the x-axis, but locked nodes on the y-axis according to their EDI. For each community, nodes were placed randomly on the x-axis. The anti-gravity+spring simulation then moved the nodes along the x-axis only, according to the anti-gravity and spring forces generated by neighboring nodes within the same community. This resulted in a graph of nodes and edges, as described above with reference to FIG. 4. In particular, for the #ai hashtag community using the EDI scores (similar to first community 402 of FIG. 4), the most diverse hashtag is #ai, followed by #bigdata, #python, and #machinelearning. At the very bottom of the #ai community hierarchy (see bottom of Table 1) are extremely specific terms including #diango (potential misspelling of #django), #hpcmeetsai, #alexaconf2019, and #datacentergroup, which appear semantically relevant but very narrowly applicable. The #ai hashtag community was also examined in the wider context of strongly connected neighbor communities (similar to second community 430 and third community 432 of FIG. 4). The #ai community is most strongly connected to the #art, #free, #love, and #usa hashtag communities, although it is also connected to many other communities.

Next, how the measures of diversity were represented by hashtags was investigated. The top five most diverse hashtags for each domain are displayed in Table 2 below, in which the Diversity Measure row indicates the domain of diversity, with the maximum value for any hashtag in that domain shown in the Max SDI row. Highest Diversity shows the hashtags with the highest five SDI measures in that domain, in descending order. Day-of-Week is the smallest domain with seven possible options and User is the largest domain with 8,148,904 possible options.

TABLE 2

Hashtag SDI Measures

| Diversity Measure | Hashtag Co-occurrence | Community | Month-of-Year |
|---|---|---|---|
| Max SDI | 14.46 | 6.28 | 3.58 |
| Hashtags with Highest Diversity | nsfw<br>free<br>ukjobs<br>love<br>job | giveaway<br>trump<br>coronavirus<br>breaking<br>art | link<br>channel<br>friskyfriday<br>******<br>btc |

| Diversity Measure | Year-and-Month | Day-of-Week | User |
|---|---|---|---|
| Max SDI | 5.12 | 2.81 | 15.98 |
| Hashtags with Highest Diversity | troprockmusic<br>twitch<br>troprock<br>webcomic<br>parrothead | kuzu<br>imth<br>harvardinautumn<br>******<br>twittfamily | teenchoice<br>soundcloud<br>twitterbestfandom<br>soompiawards<br>iheartawards |

A few observations about these results: (1) #nsfw is the hashtag that co-occurs most uniformly; (2) #giveaway is the most uniformly co-occurring hashtag with all 36,975 hashtag communities; (3) #link is the most uniformly distributed hashtag across all twelve months of the year; (4) #troprockmusic is the most uniformly distributed hashtag across all thirty-six year-and-month combinations with all other 370,105 hashtags; (5) #kuzu is the most uniformly distributed hashtag across the seven days of the week; and (6) #teenchoice is the most uniformly distributed hashtag across the 8,148,904 users.

Broadly, the more uniform a distribution is over a larger space of possibilities, the higher the diversity measure, but the implications of each of the six domain's diversity measures is worth discussion: (1) hashtag co-occurrence diversity—a higher measure indicates a hashtag is associated with more hashtags; (2) community diversity—a higher measure indicates a hashtag is applicable to more topics; (3) month-of-year diversity—a lower measure may indicate seasonality; (4) year-and-month diversity—a higher measure indicates a recurring concept, while a lower measure implies a relation to a specific event; (5) day-of-week diversity—a lower measure indicates the hashtag is more applicable to a specific part or day of the week; and (6) user diversity—a higher measure indicates wider popularity and acceptance. Hashtag popularity can certainly increase the diversity measure across all the six measures (i.e. a higher frequency of use). The six domains were specifically included, however, to balance measures of popularity, trendiness, and topicality.

Although the ordering of hashtags by EDI appears reasonable, a comparison of the top twenty most diverse hashtags to the top twenty hashtags from the degree ranking method was investigated and an overlap of nine was found—indicating that it is unlikely that the EDI weightings are in error. For rank changes involving significant hashtags as a result of using the EDI in lieu of degree, the largest moves of the top 100 Degree Rankings and the top 100 EDI Rankings were investigated. First, the largest rank changes from the top 100 Degree Rank hashtags to their EDI Rank were identified. Second, the largest rank changes of hashtags in the top 100 EDI Rank hashtags from their Degree Rank were identified. As statistically expected, the biggest movers of the top 100 Degree Rankings were decreases in rank and the biggest movers of the top 100 EDI Rankings were increases. All the largest Top 100 Degree Rank decreases were for terms largely associated with events and people—although #coronavirus and #covid19 pertain to an extremely noteworthy event, the event nevertheless may be likely to gradually fade from public discourse. On the other hand, at least some of the largest Degree Rank increases into the top 100 EDI Ranks were rather broad (e.g., #fun, #peace, #book).

An interesting feature of these two rankings is that the character lengths of the rank-decreasing hashtags is considerably higher than the character lengths of the rank-increasing hashtags. This raised the possibility that the movement of longer hashtags to lower EDI Ranks and shorter hashtags to higher EDI Ranks was a broader trend. To examine this possibility, the mean character length of windows of 1000 hashtags were taken in decreasing rank order and it was found that the mean character length of higher EDI Rank hashtags was lower than higher Degree Rank hashtags. Conversely, the mean character length of lower EDI Rank hashtags was higher than lower Degree Rank hashtags. This suggests a more natural progression of the complexity of character combinations for EDI rankings than degree rankings.

Figure 5:
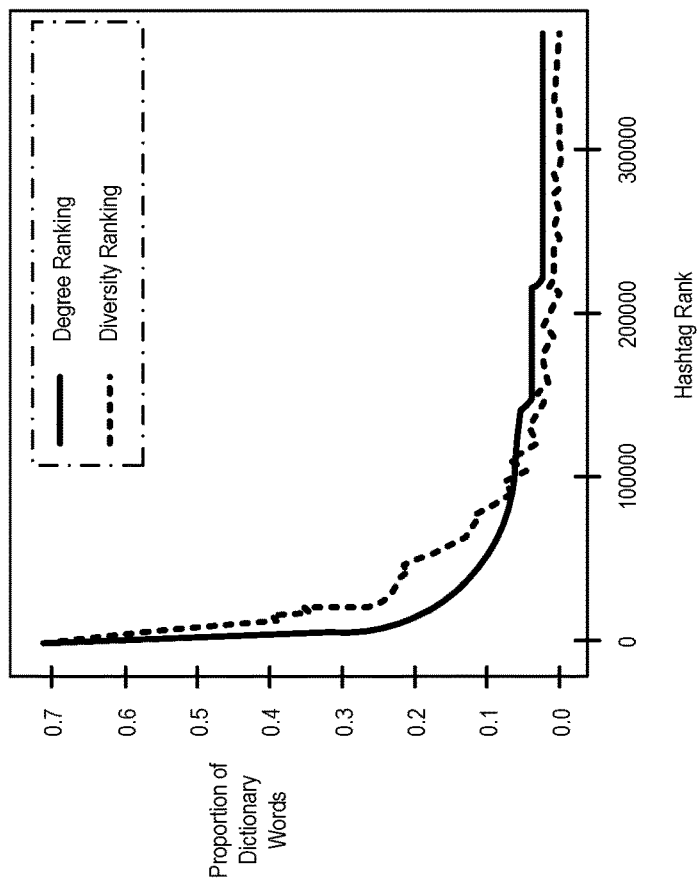
FIG. 5 includes graphs of emergent properties due to hashtag ranks for degree-based ranking and diversity-based ranking for a particular set of social media messages according to one or more aspects.
Figure 5:
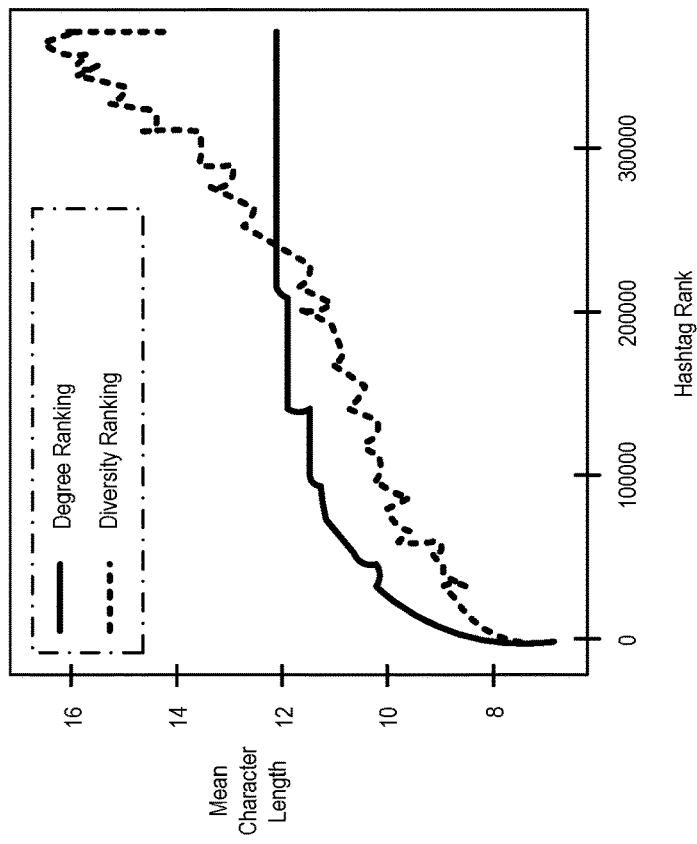

Another question was if a higher frequency of dictionary word hashtags would be an outcome of the shorter hashtags, in case the increased length of certain hashtags was due to modifications of a base hashtag such as dating (e.g. #nbafinals vs. #nbafinals2019) or concatenation (e.g., #art vs. #digitalart). 6.68% of all hashtags in the graph were dictionary word hashtags. The mean and median ranks of dictionary word hashtags for EDI (mean=52518.5, median=34996) and degree co-occurrence (mean~107457.9, median~67043.5) indicate that dictionary word hashtags are skewed towards higher (i.e., more general) ranks with EDI than with degree co-occurrence. This suggests a more natural progression of dictionary to non-dictionary word hashtags for EDI rankings. Hashtags not found in the dictionary are more likely to consist of phrases or invented words that are applicable to a narrower set of situations. This is in contrast with dictionary word hashtags, which consist of words general enough to be found in a dictionary. That these two trends of character length and dictionary word progression of the EDI hierarchy emerge despite not being accounted for in the generation process is additional evidence that the EDI-based hierarchy is reasonable. To illustrate, FIG. 5 includes graphs of emergent properties due to hashtag ranks for degree-based ranking and diversity-based (e.g., EDI-based) ranking for a particular set of social media messages. FIG. 5 shows a first graph 500 that illustrates the relationship between mean character length and hashtag rank, and a second graph 502 that illustrate the relationship between proportion of dictionary words and hashtag rank. As shown by first graph 500, the mean character length of higher degree ranked hashtags rises much faster and levels out much sooner than EDI ranked hashtags. The mean character length of the degree ranked hashtags flattens out around rank 100,000, while the mean character length of EDI ranked hashtags continues to increase almost throughout the entire 370,105 term folksonomy. As shown by second graph 502, the proportion of dictionary word hashtags is larger for higher EDI ranked hashtags than higher degree ranked hashtags.

Instead of making any assumptions about the relationships represented through co-occurrences, the predictability of a hashtag's context is relied on to establish the relationships. The basic question being answered with this process is "given a hashtag, what can be guessed about other features of the tweet?" More diverse (i.e., general) hashtags will have a larger space of possibilities, while less diverse (i.e., more specific) hashtags will have a smaller space of possibilities. Given this question, another possible, subtly different perspective on hashtag generality could be through actual prediction (e.g., using deep learning)—more general hashtags would be less predictive than more specific hashtags.

Measures of entropy prevent infrequent hashtags from being considered diverse. Notably, this could mean that a general English language word used infrequently as a hashtag would not be considered a diverse hashtag. Words have multiple meanings, and only one or a few of them might be adopted by users in a folksonomy. This is another reason why what might be considered general in the official language is not as general in the folksonomy—e.g., the #rt hashtag on Twitter represents a request of its reader to retweet the tweet. Retweeting is a very specific action which has a limited use case in the English language, despite its common use on Twitter.

In the implementations that were investigated, it was decided to linearly combine the six SDI measures, because two issues arose during consideration of a more rigorous calculation of their joint entropy. First, given that there was only access to a 1% sample of the data feed, it likely included mostly unique date+user+hashtag combinations. The average probability $\hat{P}(x_1, \ldots, x_6)$ for each combination of hashtag, year/month, month, user, weekday, and community is very likely to approach the uniform distribution $1/N$ where N is the number of instances of a hashtag. Second, under a joint probability calculation, the distinction between hashtag use by Year-and-Month (i.e., an "event"), month of the year (i.e., "seasonality"), and day of the week would be removed. For example, it may not have been possible to separate the month from the year-and-month in a joint entropy calculation. This would have eliminated the possibility of understanding the seasonality of a hashtag mostly recurring during the same few months every year, as distinct from an event-related hashtag that appeared over the same number of months in one continuous block.

Some of the choices made that affect large aspects of the generated hierarchy, include: (1) which measures of diversity to include; (2) how to weight the measures; (3) the method of community detection, given that Community Diversity was a selected feature; and (4) the time frame of data used. If any of these choices were different, the resulting hierarchy would change. Further, which measures of diversity are included and how they are weighted has obvious influence on the resulting hierarchy. Additional measures of diversity could include the hour of the day and the geographic location in which a hashtag was used. The hour of the day might distinguish the difference in diversity between #breakfast and #meals, for example, geographic location might distinguish between different dialects and regional terms from the same language, and user communities may distinguish between broad and narrow popularity.

As described above, in other implementations, other weightings (or diversity metrics) may be used. This is merely one method by which someone may arrive at a weighting scheme that better reflects their outlook of diversity. One might be more interested in the temporal aspect of a hashtag, while another might consider the user base to be a more important attribute. The above-described method is an objective weighting method that is used in cases when objectivity is difficult. It may be impossible (or difficult) to learn weights from a true (e.g., unknown) hierarchy or from curated semantic ontologies. Further, human judgement of hashtag generality could be wrong unless the person is an extremely heavy user of Twitter and is fluent in "Twitter-speak," for which there is no guarantee given the highly dynamic nature of social media itself.

Asynchronous label propagation was found to create the most semantically-consistent hashtag communities, but it is not a deterministic process and other methods of community detection may produce different, and potentially more semantically-consistent, communities for other users with other goals. Many other communities than those presented here were investigated, and while the vast majority of communities appear semantically consistent, the largest communities (i.e., those with thousands of hashtags) contain many of the most frequent hashtags and can appear less consistent, owing to strong co-occurrences. Other methods might reduce the number of extremely large communities by reducing the impact of the strong co-occurrence of the most popular hashtags, which could lead to more semantic consistency.

The timeframe of data used to construct the hierarchy may also affect the outcome, as term semantics in the folksonomy drift over time. This also illustrates the advantage of a fully automated hierarchy generation method like EDI, especially as compared to any process with manual effort. As events unfold, certain hashtags will assume a variety of different semantics and it is both difficult and time consuming for experts to track those changes—e.g., #minnesota had a very different context prior to the murder of George Floyd on May 25, 2020 in Minneapolis, which sparked massive protests across the United States.

In summary, an automatic hashtag hierarchy using Shannon's entropy as a mathematical definition of the diversity of hashtags has been investigated. EDI considers six different domains of diversity which are linearly combined for a more holistic view of a hashtag's diversity and how applicable it is to different contexts. While hashtag hierarchies based on co-occurrence alone may be simpler to compute, they are more a representation of the data as is at a given point in time and any alignment with established semantic hierarchies is likely to be coincidental and require additional processing (e.g., using cosine similarity to collapse related nodes). In contrast, the EDI-based method provides a way to not only form a more resilient hierarchy, but a framework for adaptation either through adjustment of weights, or the inclusion (or subtraction) of different diversity measures.

Figure 6:
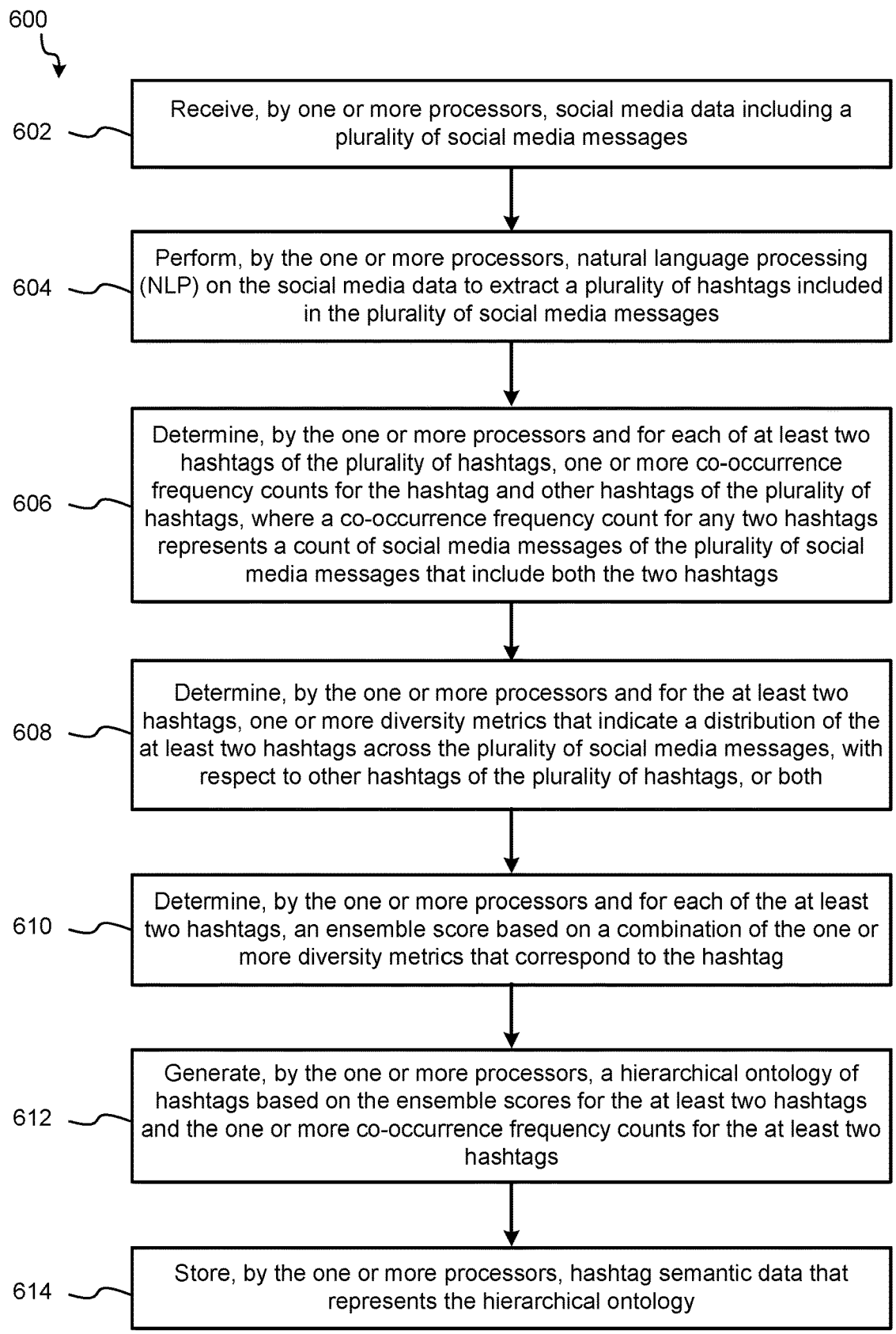
FIG. 6 is a flow diagram illustrating an example of a method for determining hierarchical relationships of hashtags in social media data according to one or more aspects.

Referring to FIG. 6, a flow diagram of a method 600 for determining semantic relationships between hashtags in social media messages, according to one or more aspects, is shown. In some implementations, the operations of method 600 may be stored as instructions that, when executed by one or more processors (e.g., the one or more processors of a computing device or a server), cause the one or more processors to perform the operations of method 600. In some implementations, method 600 may be performed by system 100 of FIG. 1, one or more components to execute the operations described with reference to FIG. 2, or a combination thereof.

Method 600 includes receiving social media data including a plurality of social media messages, at 602. For example, the NLP engine 120 of FIG. 1 may receive input data representing multiple social media messages, such as from one or more social media feeds, one or more social media pages, one or more social media apps, or the like. Method 600 includes performing NLP on the social media data to extract a plurality of hashtags included in the plurality of social media messages, at 604. For example, the NLP engine 120 of FIG. 1 may perform one or more NLP operations on the social media data to extract a plurality of hashtags from the social media data.

Method 600 includes determining, for each of at least two hashtags of the plurality of hashtags, one or more co-occurrence frequency counts for the hashtag and other hashtags of the plurality of hashtags, at 606. A co-occurrence frequency count for any two hashtags represents a count of social media messages of the plurality of social media messages that include both the two hashtags. For example, the co-occurrence analyzer 122 of FIG. 1 may determine, for any hashtag extracted by the NLP engine 120, a co-occurrence frequency of the hashtag with another hashtag (e.g., a count of the social media messages that include both the hashtag and the other hashtag in the same message).

Method 600 includes determining, for the at least two hashtags, one or more diversity metrics that indicate a distribution of the at least two hashtags across the plurality of social media messages, with respect to other hashtags of the plurality of hashtags, or both, at 608. For example, the diversity metric engine 124 of FIG. 1 may determine one or more diversity metrics for at least two hashtags based on social media metadata and/or the co-occurrence frequency counts for the at least two hashtags with one or more other hashtags. Method 600 includes determining, for each of the at least two hashtags, an ensemble score based on a combination of the one or more diversity metrics that correspond to the hashtag, at 610. For example, the ensemble scorer 126 of FIG. 1 may calculate an ensemble score for any hashtag based on the on the one or more diversity metrics that correspond to the hashtag.

Method 600 includes generating a hierarchical ontology of hashtags based on the ensemble scores for the at least two hashtags and the one or more co-occurrence frequency counts for the at least two hashtags, at 612. For example, the ontology generator 128 of FIG. 1 may generate a hierarchical ontology for some or all of the hashtags based on the corresponding ensemble scores and co-occurrence frequency counts. Method 600 includes storing hashtag semantic data that represents the hierarchical ontology, at 614. For example, the ontology generator 128 of FIG. 1 may generate and store semantic data representing the generated hierarchical ontology, such as at the database 113.

In some implementations, generating the hierarchical ontology includes generating a graph of nodes and edges based on the at least two hashtags and the one or more co-occurrence frequency counts and performing community detection on the graph to arrange the nodes into one or more communities based on weights of the edges. The nodes may correspond to hashtags, and the weights of the edges between nodes may correspond to co-occurrence frequency of the hashtags represented by the nodes. For example, the graph of nodes may correspond to the graph shown in FIG. 3, in which nodes represent hashtags and edges between nodes represent the co-occurrence frequency between the hashtags represented by the connected nodes. As further described with reference to FIG. 3, community detection may be performed on the nodes to arrange (e.g., cluster) the nodes into communities based on weights of edges (e.g., based on hashtag co-occurrences). In some such implementations, generating the hierarchical ontology also includes ordering the nodes of each of the one or more communities based on the ensemble scores corresponding to the hashtags represented by the nodes. For example, the graph may be arranged such that the nodes of a community in a particular direction represent decreasing (or increasing) ensemble scores, as shown in the example of FIG. 4. In some such implementations, the hierarchical ontology may represent an organization of communities of highest co-occurring hashtags, with hashtags in each community ordered based on diversity of the hashtags, as shown in FIG. 4. Additionally or alternatively, generating the hierarchical ontology may include pruning the hierarchical ontology based on a co-occurrence threshold, a user threshold, a connection threshold, or a combination thereof. For example, to generate the example shown in FIG. 4, one or more nodes that are unconnected, one or more nodes having edges to a highest node of a community that fail to satisfy a weight threshold, one or more nodes that correspond to quantity of users that fail to satisfy a user threshold, or a combination thereof, may be pruned.

In some implementations, the one or more diversity metrics may be based on community assignments corresponding to the at least two hashtags, date or time information corresponding to the plurality of social media messages, user information corresponding to the plurality of social media messages, or a combination thereof. For example, the diversity metric engine 124 may determine the one or more diversity metrics based on community assignments (e.g., based on co-occurrence frequency counts) for a corresponding hashtag and other hashtags or based on social media metadata corresponding to social media messages that include the hashtag (e.g., date or time information, such as a year and month, year, month, day, and/or time that a social media messages is posted, user information indicating user(s) that post the social media messages, and the like). In some implementations, the diversity metrics may be based on the Shannon Diversity Index. In some such implementations, the one or more diversity metrics may include a hashtag co-occurrence diversity metric, a community diversity metric, a month diversity metric, a year and month diversity metric, a day diversity metric, a user diversity metric, or a combination thereof. The co-occurrence diversity metric may measure an amount of other hashtags that a corresponding hashtag co-occurs with in the same social media message, the community diversity metric may measure an amount of other hashtags from other communities that a corresponding hashtag co-occurs with in the same social media message, the month diversity metric may measure an amount of different months associated with social media messages that include a corresponding hashtag, the year and month diversity metric may measure an amount of different year and month combinations associated with social media messages that include a corresponding hashtag, the day diversity metric may measure an amount of different days associated with social media messages that include a corresponding hashtag, and the user diversity metric may measure an amount of different users associated with social media messages that include a corresponding hashtag.

In some implementations, the ensemble score may include a sum or a weighted sum of the one or more diversity metrics. For example, the ensemble scorer 126 of FIG. 1 may sum the diversity metrics for a hashtag to calculate the ensemble score, optionally after weighting the diversity metrics. In some such implementations, determining the ensemble score includes normalizing each of the one or more diversity metrics based on category-specific maximums to generate one or more normalized diversity metrics, applying category-specific weights to the one or more normalized diversity metrics to generate one or more weighted diversity metrics, and generating a sum of the one or more weighted diversity metrics to generate the ensemble score. In some such implementations, the category-specific weights may be based on multiple iterations of hashtag community hierarchy inspection.

In some implementations, the method 600 may also include receiving input data that includes a first hashtag and outputting a text output that includes one or more hashtags that are hierarchically higher (i.e., that have higher ensemble scores) within a same community as the first hashtag in the hierarchical ontology. For example, the semantic engine 130 of FIG. 1 may receive input data that includes one or more hashtags, and the semantic engine 130 may access the semantic data representing the hierarchical ontology to generate a text output that includes one or more hashtags that are hierarchically higher (i.e., that have higher ensemble scores) than the one or more hashtags within corresponding communities within the hierarchical ontology. In some such implementations, the method 600 may include receiving an input social media message that includes a first hashtag, identifying one or more hashtags that are hierarchically higher (i.e., that have higher ensemble scores) within a same community as the first hashtag in the hierarchical ontology, and outputting a recommendation for additional hashtags (including the one or more hashtags) to include in the input social media message. Additionally or alternatively, the method 600 may include receiving training data that includes a first hashtag, identifying one or more hashtags that are hierarchically higher (i.e., that have higher ensemble scores) within a same community as the first hashtag in the hierarchical ontology, and outputting expanded training data that includes the first hashtag and the one or more hashtags. Additionally or alternatively, the method 600 may include receiving a trending hashtag, identifying one or more hashtags that are hierarchically higher (i.e., that have higher ensemble scores) within a same community as the trending hashtag in the hierarchical ontology, and outputting a prediction of additional trending hashtags that includes the one or more hashtags.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

Functional blocks and modules in FIGS. 1-6 may comprise processors, electronics devices, hardware devices, electronics components, logical circuits, memories, software codes, firmware codes, etc., or any combination thereof. Consistent with the foregoing, various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media can include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, hard disk, solid state disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed aspect, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and, or.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and processes described in the specification. As one of ordinary skill in the art will readily appreciate from the present disclosure, processes, machines, manufacture, compositions of matter, means, methods, or operations, presently existing or later to be developed that perform substantially the same function or achieve substantially the same result as the corresponding aspects described herein may be utilized according to the present disclosure. Accordingly, the appended claims are intended to include within their scope such processes, machines, manufacture, compositions of matter, means, methods, or operations.

What is claimed is:

1. A method for determining semantic relationships between hashtags in social media messages, the method comprising:
    receiving, by one or more processors, social media data including a plurality of social media messages;
    performing, by the one or more processors, natural language processing (NLP) on the social media data to extract a plurality of hashtags included in the plurality of social media messages;
    determining, by the one or more processors and for each of at least two hashtags of the plurality of hashtags, one or more co-occurrence frequency counts for the hashtag and other hashtags of the plurality of hashtags, wherein a co-occurrence frequency count for any two hashtags represents a count of social media messages of the plurality of social media messages that include both the two hashtags;
    detecting, by the one or more processors and for each of the at least two hashtags, at least one community of a plurality of communities based at least in part on the co-occurrence frequency counts of the at least two hashtags, wherein the at least one community comprises a topic semantically related to the hashtag;
    determining, by the one or more processors and for the at least two hashtags, one or more diversity metrics that indicate a distribution of the at least two hashtags across the plurality of social media messages or with respect to other hashtags of the plurality of hashtags, wherein the one or more diversity metrics include a community diversity metric that measures an amount of other hashtags from different communities of the plurality of communities with which a corresponding hashtag co-occurs in the same social media message, wherein the community diversity metric corresponds to how many different communities are detected for each of the at least two hashtags;
    determining, by the one or more processors and for each of the at least two hashtags, an ensemble score based on a combination of the one or more diversity metrics that correspond to the hashtag;
    generating, by the one or more processors, a hierarchical ontology of hashtags based on the ensemble scores for the at least two hashtags and the one or more co-occurrence frequency counts for the at least two hashtags; and
    storing, by the one or more processors, hashtag semantic data that represents the hierarchical ontology.

2. The method of claim 1, wherein generating the hierarchical ontology comprises:
    generating, by the one or more processors, a graph of nodes and edges based on the at least two hashtags and the one or more co-occurrence frequency counts of the hashtags, wherein the nodes correspond to hashtags and weights of the edges between nodes correspond to co-occurrence frequency counts of the hashtags represented by the nodes; and
    performing, by the one or more processors, community detection on the graph to arrange the nodes into one or more communities based on the weights of the edges.

3. The method of claim 2, wherein generating the hierarchical ontology further comprises:
ordering, by the one or more processors, the nodes of each of the one or more communities based on the ensemble scores corresponding to the hashtags represented by the nodes.

4. The method of claim 3, wherein the hierarchical ontology represents an organization of communities of different topics, and wherein hashtags in each community are ordered based on diversity of the hashtags.

5. The method of claim 1, wherein determining the ensemble score comprises:
normalizing, by the one or more processors, each of the one or more diversity metrics based on category-specific maximums to generate one or more normalized diversity metrics;
applying, by the one or more processors, category-specific weights to the one or more normalized diversity metrics to generate one or more weighted diversity metrics; and
generating, by the one or more processors, a sum of the one or more weighted diversity metrics, wherein the ensemble score comprises the sum.

6. The method of claim 5, wherein the category-specific weights are based on multiple iterations of hashtag community hierarchy inspection.

7. The method of claim 1, further comprising:
receiving, by the one or more processors, an input social media message that includes a first hashtag;
identifying, by the one or more processors and based on the hashtag semantic data, one or more hashtags that are hierarchically higher within a same community as the first hashtag in the hierarchical ontology; and
outputting, by the one or more processors, a recommendation for additional hashtags to include in the input social media message, the recommendation including the one or more hashtags.

8. The method of claim 1, further comprising:
receiving, by the one or more processors, training data that includes a first hashtag;
identifying, by the one or more processors and based on the hashtag semantic data, one or more hashtags that are hierarchically higher within a same community as the first hashtag in the hierarchical ontology; and
outputting, by the one or more processors, expanded training data that includes the first hashtag and the one or more hashtags.

9. The method of claim 1, further comprising:
receiving, by the one or more processors, a trending hashtag;
identifying, by the one or more processors and based on the hashtag semantic data, one or more hashtags that are hierarchically higher within a same community as the trending hashtag in the hierarchical ontology; and
outputting, by the one or more processors, a prediction of additional trending hashtags that includes the one or more hashtags.

10. A system for determining semantic relationships between hashtags in social media messages, the system comprising:
a memory; and
one or more processors communicatively coupled to the memory, the one or more processors configured to:
receive social media data including a plurality of social media messages;
perform natural language processing (NLP) on the social media data to extract a plurality of hashtags included in the plurality of social media messages;
determine, for each of at least two hashtags of the plurality of hashtags, one or more co-occurrence frequency counts for the hashtag and other hashtags of the plurality of hashtags, wherein a co-occurrence frequency count for any two hashtags represents a count of social media messages of the plurality of social media messages that include both the two hashtags;
detect, for each of the at least two hashtags, at least one community of a plurality of communities based at least in part on the co-occurrence frequency counts of the at least two hashtags, wherein the at least one community comprises a topic semantically related to the hashtag;
determine, for the at least two hashtags, one or more diversity metrics that indicate a distribution of the at least two hashtags across the plurality of social media messages or with respect to other hashtags of the plurality of hashtags,
wherein the one or more diversity metrics include a community diversity metric that measures an amount of other hashtags from different communities of the plurality of communities with which a corresponding hashtag co-occurs with-in the same social media message,
wherein the community diversity metric corresponds to how many different communities are detected for each of the at least two hashtags;
determine, for each of the at least two hashtags, an ensemble score based on a combination of the one or more diversity metrics that correspond to the hashtag;
generate a hierarchical ontology of hashtags based on the ensemble scores for the at least two hashtags and the one or more co-occurrence frequency counts for the at least two hashtags; and
store hashtag semantic data that represents the hierarchical ontology.

11. The system of claim 10, wherein the ensemble score comprises a weighted sum of the one or more diversity metrics.

12. The system of claim 10, wherein the one or more diversity metrics include a hashtag co-occurrence diversity metric, a month diversity metric, a year and month diversity metric, a day diversity metric, a user diversity metric, or a combination thereof.

13. The system of claim 12, wherein the hashtag co-occurrence diversity metric measures an amount of other hashtags that a corresponding hashtag co-occurs with in the same social media message.

14. The system of claim 12, wherein the month diversity metric measures an amount of different months associated with social media messages that include a corresponding hashtag.

15. The system of claim 12, wherein the year and month diversity metric measures an amount of different year and month combinations associated with social media messages that include a corresponding hashtag.

16. The system of claim 12, wherein the day diversity metric measures an amount of different days associated with social media messages that include a corresponding hashtag.

17. The system of claim 12, wherein the user diversity metric measures an amount of different users associated with social media messages that include a corresponding hashtag.

18. The system of claim 10, further comprising:
a database coupled to the one or more processors, the database configured to store the hashtag semantic data, the hierarchical ontology, the plurality of hashtags, the one or more co-occurrence frequency counts, the one or more diversity metrics, the ensemble score, or a combination thereof.

19. The system of claim 10, further comprising:
an interface configured to enable communication with a data source that stores the social media data, an electronic device, or a combination thereof.

20. A non-transitory computer-readable storage medium storing instructions that, when executed by one or more processors, cause the one or more processors to perform operations for determining semantic relationships between hashtags in social media messages, the operations comprising:
receiving social media data including a plurality of social media messages;
performing natural language processing (NLP) on the social media data to extract a plurality of hashtags included in the plurality of social media messages;
determining, for each of at least two hashtags of the plurality of hashtags, one or more co-occurrence frequency counts for the hashtag and other hashtags of the plurality of hashtags, wherein a co-occurrence frequency count for any two hashtags represents a count of social media messages of the plurality of social media messages that include both the two hashtags;
detecting, by the one or more processors and for each of the at least two hashtags, at least one community of a plurality of communities based at least in part on the co-occurrence frequency counts of the at least two hashtags, wherein the at least one community comprises a topic semantically related to the hashtag;
determining, for the at least two hashtags, one or more diversity metrics that indicate a distribution of the at least two hashtags across the plurality of social media messages or with respect to other hashtags of the plurality of hashtags,
wherein the one or more diversity metrics include a community diversity metric that measures an amount of other hashtags from different communities of the plurality of communities with which a corresponding hashtag co-occurs in the same social media message,
wherein the community diversity metric corresponds to how many different communities are detected for each of the at least two hashtags;
determining, for each of the at least two hashtags, an ensemble score based on a combination of the one or more diversity metrics that correspond to the hashtag;
generating a hierarchical ontology of hashtags based on the ensemble scores for the at least two hashtags and the one or more co-occurrence frequency counts for the at least two hashtags; and
storing hashtag semantic data that represents the hierarchical ontology.

21. The non-transitory computer-readable storage medium of claim 20, wherein:
the hierarchical ontology comprises a graph representation of nodes and edges based on the at least two hashtags and the one or more co-occurrence frequency counts of the hashtags;
the nodes correspond to hashtags;
weights of the edges between nodes correspond to co-occurrence frequency counts of the hashtags represented by the nodes; and
the graph representation is arranged into one or more community clusters in which hashtags corresponding to nodes in the community cluster are ranked based on corresponding ensemble scores.

22. The non-transitory computer-readable storage medium of claim 21, wherein the operations further comprise pruning the hierarchical ontology based on a co-occurrence threshold, a user threshold, a connection threshold, or a combination thereof.

23. The non-transitory computer-readable storage medium of claim 20, wherein the one or more diversity metrics are based on community assignments corresponding to the at least two hashtags, date or time information corresponding to the plurality of social media messages, user information corresponding to the plurality of social media messages, or a combination thereof.

24. The non-transitory computer-readable storage medium of claim 20, wherein the operations further comprise:
receiving input data that includes a first hashtag; and
outputting a text output that includes one or more hashtags that are hierarchically higher within a same community as the first hashtag in the hierarchical ontology.

* * * * *

UNITED STATES PATENT AND TRADEMARK OFFICE
CERTIFICATE OF CORRECTION

PATENT NO. : 12,367,347 B2
APPLICATION NO. : 17/581666
DATED : July 22, 2025
INVENTOR(S) : Spencer Bradley Torene et al.

It is certified that error appears in the above-identified patent and that said Letters Patent is hereby corrected as shown below:

In the Specification

At Column 6, Line number 39, delete "j argon" and replace with --jargon--.
At Column 30, Line number 59, delete "Nis" and replace with --N is--.

In the Claims

At Column 40, Claim number 10, Line number 24, delete "with-in" and replace with --in--.

Signed and Sealed this
Twenty-sixth Day of August, 2025

Coke Morgan Stewart
*Acting Director of the United States Patent and Trademark Office*